(12) United States Patent
Hasegawa et al.

(10) Patent No.: US 11,375,113 B2
(45) Date of Patent: Jun. 28, 2022

(54) IMAGING ELEMENT, AND IMAGING APPARATUS WHICH CHANGES FRAME RATE OF OUTPUT IMAGE DATA BASED ON DERIVED FOCUS EVALUATION VALUE

(71) Applicant: FUJIFILM CORPORATION, Tokyo (JP)

(72) Inventors: Ryo Hasegawa, Saitama (JP); Tomoyuki Kawai, Saitama (JP); Hitoshi Sakurabu, Saitama (JP); Makoto Kobayashi, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/351,270

(22) Filed: Jun. 18, 2021

(65) Prior Publication Data

US 2021/0314495 A1    Oct. 7, 2021

Related U.S. Application Data

(63) Continuation of application No. PCT/JP2019/049220, filed on Dec. 16, 2019.

(30) Foreign Application Priority Data

Dec. 26, 2018  (JP) .............................. JP2018-243664

(51) Int. Cl.
*H04N 5/232* (2006.01)

(52) U.S. Cl.
CPC ... *H04N 5/232411* (2018.08); *H04N 5/23229* (2013.01); *H04N 5/232122* (2018.08)

(58) Field of Classification Search
CPC ....... H04N 5/232411; H04N 5/232122; H04N 5/23229; H04N 5/232123; H04N 5/23209; H04N 5/225; H04N 5/345; H04N 5/351

See application file for complete search history.

(56) References Cited

U.S. PATENT DOCUMENTS 6,972,799 B1 * 12/2005 Hashimoto .......... H04N 5/2353
                                                          348/E5.037
10,116,856 B2 * 10/2018 Kikuchi ........... H04N 5/232935
(Continued)

FOREIGN PATENT DOCUMENTS

JP      2010-88050 A    4/2010
JP      2014-86872 A    5/2014
(Continued)

OTHER PUBLICATIONS

International Search Report issued in International Application No. PCT/JP2019/049220 dated Mar. 3, 2020.
(Continued)

*Primary Examiner* — Luong T Nguyen
(74) *Attorney, Agent, or Firm* — Solaris Intellectual Property Group, PLLC

(57) ABSTRACT

An imaging element includes a storage portion that stores image data obtained by imaging a subject at a first frame rate and is incorporated in the imaging element, a processing portion that is incorporated in the imaging element and configured to perform processing using the image data, and an output portion that outputs output image data based on the image data at a second frame rate depending on a processing result of the processing portion and is incorporated in the imaging element, in which the first frame rate is greater than or equal to the second frame rate, and the processing portion performs processing of deriving an evaluation value indicating a degree of focusing for the image data stored in the storage portion and changing the second frame rate based on the derived evaluation value.

14 Claims, 35 Drawing Sheets

(56) References Cited

U.S. PATENT DOCUMENTS

2012/0176505 A1\* 7/2012 Kim ..................... H04N 5/3454
                                                    348/222.1
2016/0234424 A1\* 8/2016 Ito ........................ H04N 5/2353

FOREIGN PATENT DOCUMENTS

| JP | 2014-178603 A | 9/2014 |
| JP | 2015-80179 A  | 4/2015 |
| JP | 2017-98903 A  | 6/2017 |

OTHER PUBLICATIONS

Written Opinion of the ISA issued in International Application No. PCT/JP2019/049220 dated Mar. 3, 2020.
International Preliminary Report on Patentability issued in International Application No. PCT/JP2019/049220 dated Aug. 11, 2020.

\* cited by examiner

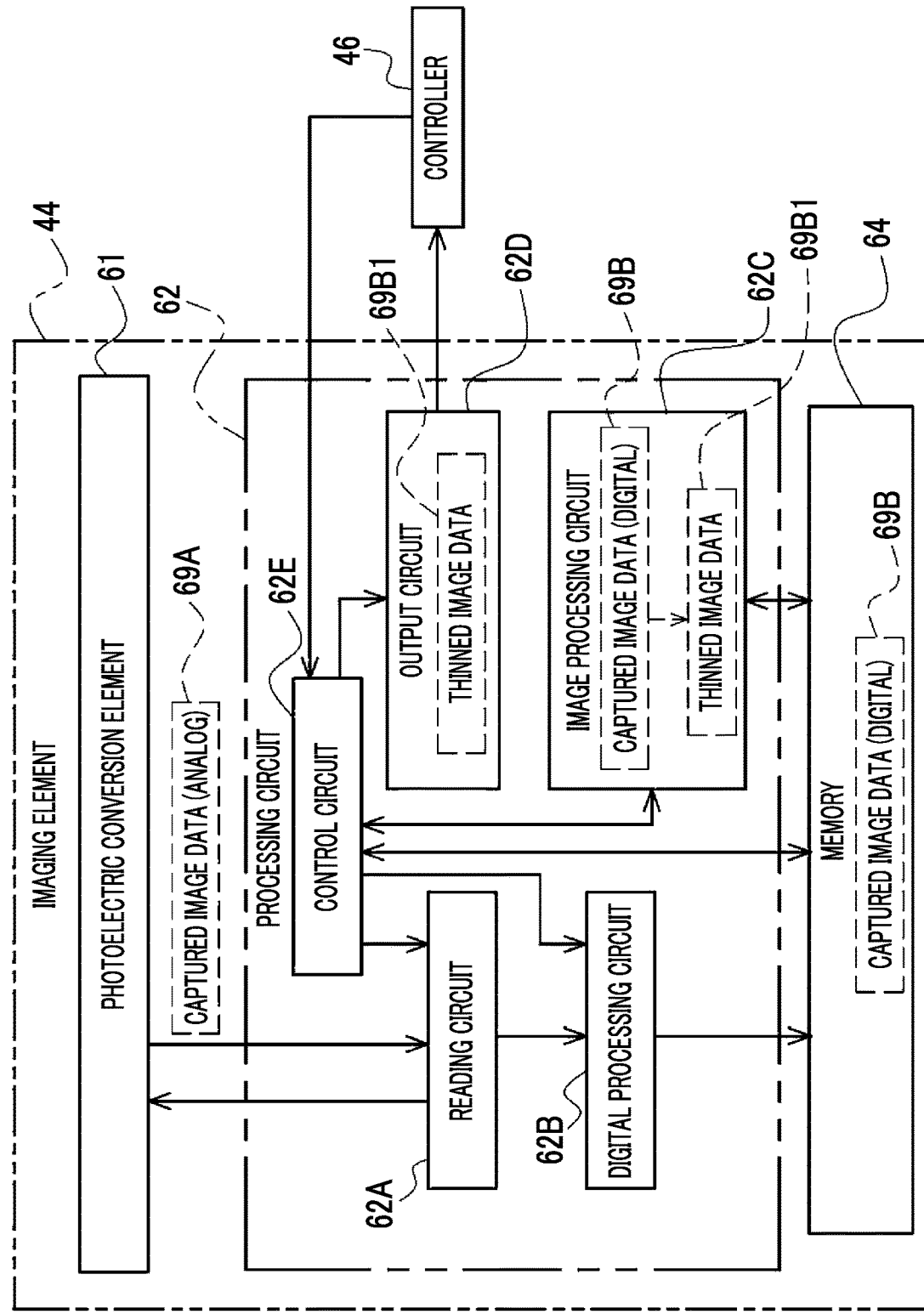

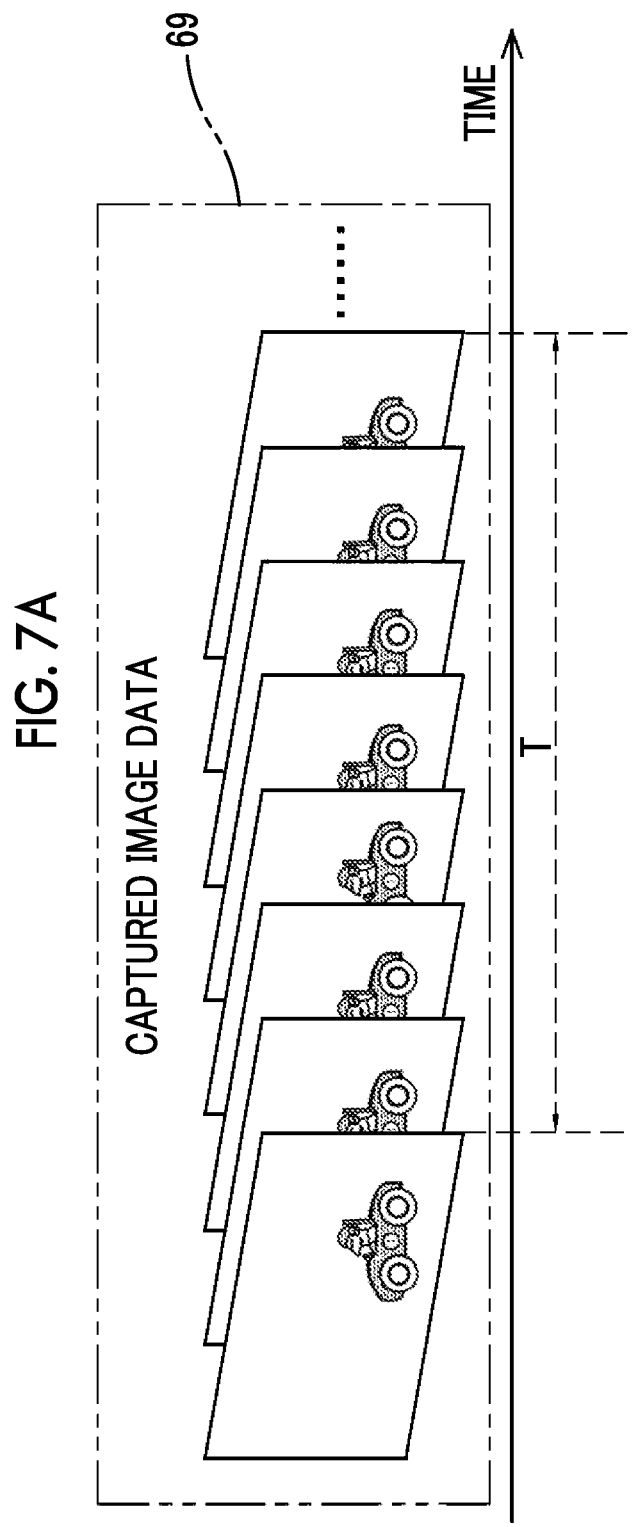

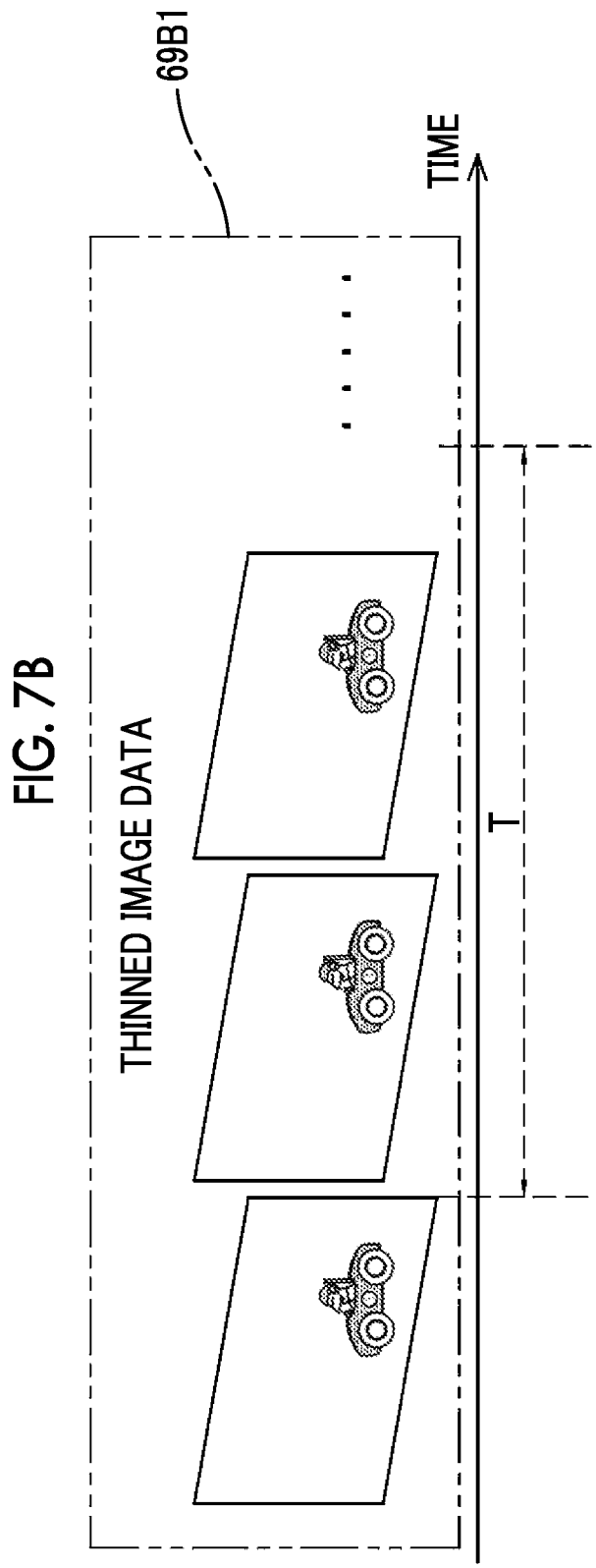

IMAGING ELEMENT, AND IMAGING APPARATUS WHICH CHANGES FRAME RATE OF OUTPUT IMAGE DATA BASED ON DERIVED FOCUS EVALUATION VALUE

CROSS-REFERENCE TO RELATED APPLICATIONS

This application is a continuation application of International Application No. PCT/JP2019/049220, filed Dec. 16, 2019, the disclosure of which is incorporated herein by reference in its entirety. Further, this application claims priority from Japanese Patent Application No. 2018-243664, filed Dec. 26, 2018, the disclosure of which is incorporated herein by reference in its entirety.

BACKGROUND

1. Technical Field

The technology of the present disclosure relates to an imaging element, an imaging apparatus, an operation method of an imaging element, and a program.

2. Description of the Related Art

JP2014-178603A discloses an imaging element in which an imaging chip, a signal processing chip, and a memory chip are laminated. In the technology disclosed in JP2014-178603A, a focal point adjustment state of a region of interest is detected based on a contrast evaluation value or a phase difference evaluation value. For the region of interest, imaging is performed at a frame rate higher than a frame rate for the other region.

JP2015-080179A discloses a technology for acquiring a first image at a first frame rate and acquiring a plurality of second images at a second frame rate higher than the first frame rate. In the technology disclosed in JP2015-080179A, focal point adjustment for a subject image is performed by controlling a position of a focus lens based on high-frequency components of the first image and the plurality of second images. An image having an expanded dynamic range is generated by selecting an image having a high focusing rate among the plurality of second images and combining the selected image with the first image.

SUMMARY

One embodiment according to the technology of the present disclosure provides an imaging element, an imaging apparatus, an operation method of an imaging element, and a program capable of reducing power consumption required for outputting image data, compared to a case of outputting every image data obtained by imaging.

A first aspect of the technology of the present disclosure is an imaging element comprising a storage portion that stores image data obtained by imaging a subject at a first frame rate and is incorporated in the imaging element, a processing portion that is incorporated in the imaging element and configured to perform processing using the image data, and an output portion that outputs output image data based on the image data at a second frame rate depending on a processing result of the processing portion and is incorporated in the imaging element, in which the first frame rate is greater than or equal to the second frame rate, and the processing portion performs processing of deriving an evaluation value indicating a degree of focusing for the image data stored in the storage portion and changing the second frame rate based on the derived evaluation value. Accordingly, power consumption required for outputting the image data can be reduced, compared to a case of outputting every image data obtained by imaging.

A second aspect of the technology of the present disclosure is the imaging element according to the first aspect, in which the second frame rate is selectively set to a low frame rate and a high frame rate that is a frame rate higher than the low frame rate, and the processing portion sets the second frame rate to the high frame rate in a case where the evaluation value is greater than or equal to a first threshold value, and sets the second frame rate to the low frame rate in a case where the evaluation value is less than the first threshold value. Accordingly, the power consumption required for outputting the image data can be reduced, compared to a case of outputting every image data.

A third aspect of the technology of the present disclosure is the imaging element according to the first or second aspect, in which the output portion, in a case where the evaluation value is less than a second threshold value, does not output the image data of a derivation target for the evaluation value less than the second threshold value. Accordingly, the power consumption required for outputting the image data can be reduced, compared to a case of outputting thinned image data for which the focusing evaluation value is less than the threshold value.

A fourth aspect of the technology of the present disclosure is the imaging element according to any one of the first to third aspects, in which a changing timing of the second frame rate is set to be earlier by a first number of frames than a timing at which the evaluation value changes from less than a third threshold value to greater than or equal to the third threshold value. Accordingly, a user can visually recognize an aspect of transitioning from a non-focused state to a focused state through an image.

A fifth aspect of the technology of the present disclosure is the imaging element according to any one of the first to fourth aspects, in which a changing timing of the second frame rate is set to be later by a second number of frames than a timing at which the evaluation value changes from greater than or equal to a fourth threshold value to less than the fourth threshold value. Accordingly, the user can visually recognize an aspect of transitioning from the focused state to the non-focused state through the image.

A sixth aspect of the technology of the present disclosure is the imaging element according to any one of the first to third aspects, in which a changing timing of the second frame rate is set to be earlier by a third number of frames than a timing at which the evaluation value changes from less than a fifth threshold value to greater than or equal to the fifth threshold value, and the changing timing of the second frame rate is set to be later by a fourth number of frames than a timing at which the evaluation value changes from greater than or equal to the fifth threshold value to less than the fifth threshold value. Accordingly, effects of both of an effect obtained from the imaging element according to the fourth aspect and an effect obtained from the imaging element according to the fifth aspect can be obtained.

A seventh aspect of the technology of the present disclosure is the imaging element according to any one of the first to sixth aspects, in which the processing portion performs thinning processing on the image data stored in the storage portion, and derives the evaluation value for the image data after the thinning processing. Accordingly, power consumption in the imaging element can be reduced, compared to a case of calculating the evaluation value by targeting non-thinned image data.

An eighth aspect of the technology of the present disclosure is the imaging element according to any one of the first to seventh aspects, further comprising an image plane phase difference pixel that receives subject light showing the subject, in which the processing portion derives the evaluation value based on a light receiving result of the image plane phase difference pixel. Accordingly, a calculation result can be quickly obtained, compared to a case of calculating a contrast value as the evaluation value.

A ninth aspect of the technology of the present disclosure is the imaging element according to any one of the first to eighth aspects, in which at least a photoelectric conversion element and the storage portion are formed in one chip. Accordingly, portability of the imaging element can be increased, compared to a case where the photoelectric conversion element and the storage portion are not formed in one chip.

A tenth aspect of the technology of the present disclosure is the imaging element according to the ninth aspect, in which the imaging element is a laminated imaging element in which the photoelectric conversion element is laminated with the storage portion. Accordingly, a transfer speed of data from the photoelectric conversion element to the storage portion can be increased, compared to a non-laminated imaging element in which the photoelectric conversion element is not laminated with the storage portion.

An eleventh aspect of the technology of the present disclosure is an imaging apparatus comprising the imaging element according to any one of the first to tenth aspects, and a display control portion that performs a control for displaying an image based on the output image data output by the output portion on a display portion. Accordingly, the power consumption required for outputting the image data can be reduced, compared to a case of outputting every image data obtained by imaging.

A twelfth aspect of the technology of the present disclosure is an imaging apparatus comprising the imaging element according to any one of the first to tenth aspects, and a storage control portion that performs a control for storing the output image data output by the output portion in a storage device. Accordingly, the power consumption required for outputting the image data can be reduced, compared to a case of outputting every image data obtained by imaging.

A thirteenth aspect of the technology of the present disclosure is an operation method of an imaging element including a storage portion that stores image data obtained by imaging a subject at a first frame rate, a processing portion that performs processing using the image data, and an output portion that outputs output image data based on the image data at a second frame rate based on a processing result of the processing portion, the storage portion, the processing portion, and the output portion being incorporated in the imaging element, the operation method comprising setting the first frame rate to be greater than or equal to the second frame rate, and by the processing portion, performing processing of deriving an evaluation value indicating a degree of focusing for the image data stored in the storage portion and changing the second frame rate based on the derived evaluation value. Accordingly, the power consumption required for outputting the image data can be reduced, compared to a case of outputting every image data obtained by imaging.

A fourteenth aspect of the technology of the present disclosure is a program causing a computer to function as a processing portion and an output portion included in an imaging element including a storage portion that stores image data obtained by imaging a subject at a first frame rate, a processing portion that performs processing using the image data, and an output portion that outputs output image data based on the image data at a second frame rate based on a processing result of the processing portion, the storage portion, the processing portion, and the output portion being incorporated in the imaging element, in which the first frame rate is greater than or equal to the second frame rate, and the processing portion performs processing of deriving an evaluation value indicating a degree of focusing for the image data stored in the storage portion and changing the second frame rate based on the derived evaluation value. Accordingly, the power consumption required for outputting the image data can be reduced, compared to a case of outputting every image data obtained by imaging.

A fifteenth aspect of the technology of the present disclosure is an imaging element comprising a memory that stores image data obtained by imaging a subject at a first frame rate and is incorporated in the imaging element, and a processor that is incorporated in the imaging element and configured to perform processing using the image data and output output image data based on the image data at a second frame rate depending on a processing result, in which the first frame rate is greater than or equal to the second frame rate, and the processor is configured to perform processing of deriving an evaluation value indicating a degree of focusing for the image data stored in the memory and changing the second frame rate based on the derived evaluation value.

BRIEF DESCRIPTION OF THE DRAWINGS

Exemplary embodiments of the technology of the disclosure will be described in detail based on the following figures, wherein:

FIG. 6 is a block diagram illustrating an example of a configuration of the imaging element according to the first to fourth embodiments;

FIG. 7A is a conceptual diagram for describing an imaging frame rate of the imaging apparatus according to the first to fourth embodiments;

FIG. 7B is a conceptual diagram for describing an output frame rate of the imaging apparatus according to the first to fourth embodiments;

DETAILED DESCRIPTION

Hereinafter, an example of embodiments of an imaging apparatus according to the embodiments of the technology of the present disclosure will be described in accordance with the appended drawings.

First, meanings of terms used in the following description will be described.

In the following description, the abbreviation CPU stands for "Central Processing Unit". In addition, in the following description, the abbreviation RAM stands for "Random Access Memory". In addition, in the following description, the abbreviation ROM stands for "Read Only Memory". In addition, in the following description, the abbreviation DRAM stands for "Dynamic Random Access Memory". In addition, in the following description, the abbreviation SRAM stands for "Static Random Access Memory".

In the following description, the abbreviation LSI stands for "Large-Scale Integration". In addition, in the following description, the abbreviation ASIC stands for "Application Specific Integrated Circuit". In addition, in the following description, the abbreviation PLD stands for "Programmable Logic Device". In addition, in the following description, the abbreviation FPGA stands for "Field-Programmable Gate Array".

In the following description, the abbreviation SSD stands for "Solid State Drive". In addition, in the following description, the abbreviation DVD-ROM stands for "Digital Versatile Disc Read Only Memory". In addition, in the following description, the abbreviation USB stands for "Universal Serial Bus". In addition, in the following description, the abbreviation HDD stands for "Hard Disk Drive". In addition, in the following description, the abbreviation EEPROM stands for "Electrically Erasable and Programmable Read Only Memory".

In the following description, the abbreviation CCD stands for "Charge Coupled Device". In addition, in the following description, the abbreviation CMOS stands for "Complementary Metal Oxide Semiconductor". In addition, in the following description, the abbreviation EL stands for "Electro-Luminescence". In addition, in the following description, the abbreviation A/D stands for "Analog/Digital". In addition, in the following description, the abbreviation FIFO stands for "First in First out". In addition, in the following description, the abbreviation I/F stands for "Interface". In addition, in the following description, the abbreviation MF stands for "Manual-Focus". In addition, in the following description, the abbreviation AF stands for "Auto-Focus". In addition, in the following description, the abbreviation AE stands for "Automatic Exposure".

First Embodiment

Figure 1:
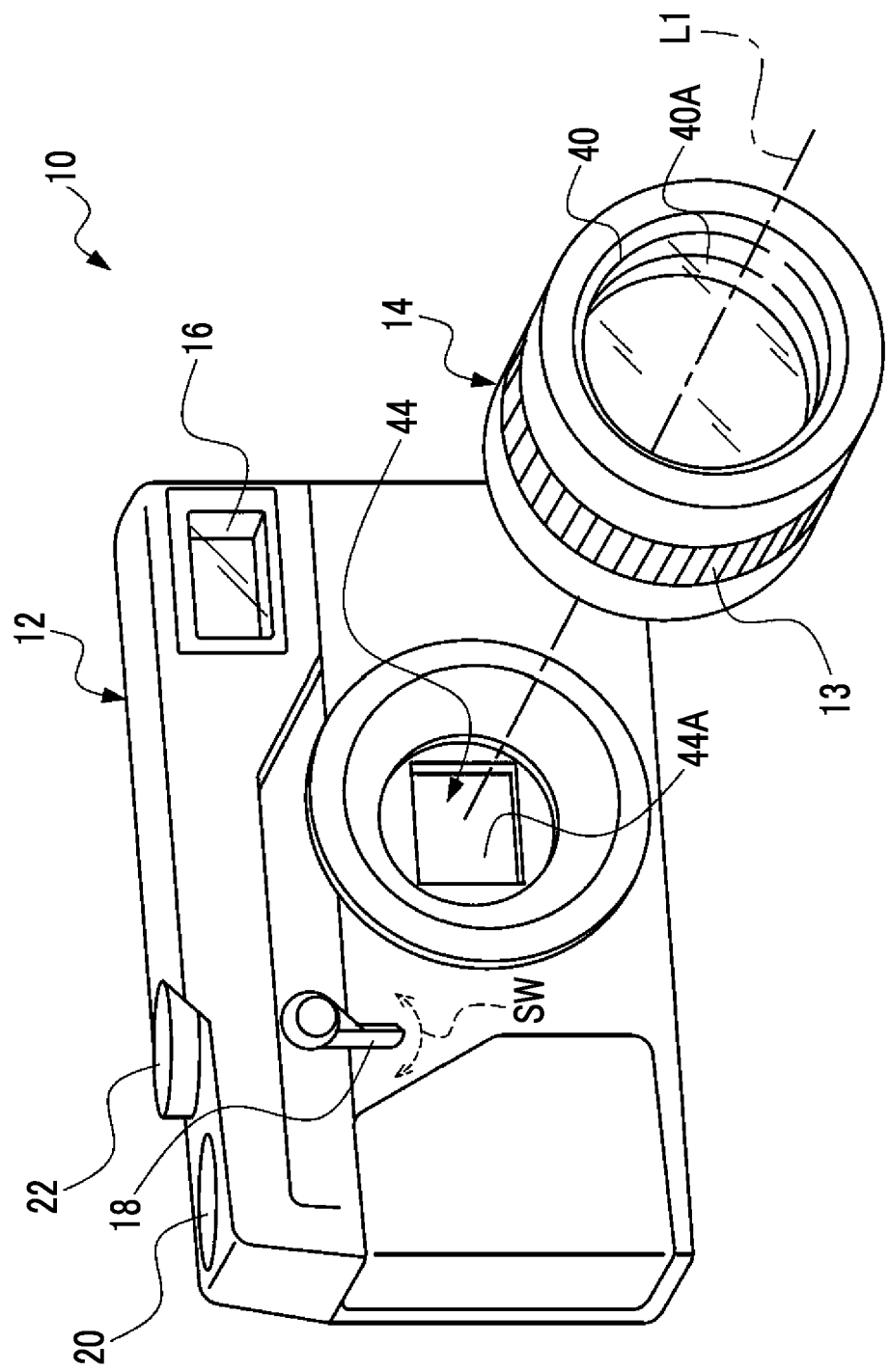
FIG. 1 is a schematic perspective view illustrating an example of an imaging apparatus according to first to fourth embodiments.

As illustrated in FIG. 1 as an example, an imaging apparatus 10 is an interchangeable lens camera. The imaging apparatus 10 is a digital camera that includes an imaging apparatus main body 12 and an interchangeable lens 14, and that does not include a reflex mirror.

A hybrid finder (registered trademark) 16 is disposed in the imaging apparatus main body 12. For example, the hybrid finder 16 here refers to a finder in which an optical view finder (hereinafter, referred to as the OVF) and an electronic view finder (hereinafter, referred to as the EVF) are selectively used. The abbreviation OVF stands for "optical viewfinder". In addition, the abbreviation EVF stands for "electronic viewfinder".

An imaging element 44 is disposed in a front view center portion of the imaging apparatus main body 12. For example, the imaging element 44 is a CMOS image sensor. As will be described in detail later, the imaging element 44 is an example of a "laminated imaging element" according to the embodiments of the technology of the present disclosure. While the CMOS image sensor is illustrated here as the imaging element 44, the technology of the present disclosure is not limited thereto. For example, the technology of the present disclosure is also established in a case where the imaging element 44 is a CCD image sensor.

The interchangeable lens 14 is interchangeably mounted on the imaging apparatus main body 12. An imaging lens 40 is disposed in a lens barrel of the interchangeable lens 14. In a case where the interchangeable lens 14 is mounted on the imaging apparatus main body 12, an optical axis L1 of the imaging lens 40 is positioned in a center portion of a light receiving surface 44A of the imaging element 44, and an image of subject light showing a subject is formed on the light receiving surface 44A through the imaging lens 40.

A focus ring 13 that is used in a case where the imaging apparatus 10 is in a manual focus mode is disposed in the interchangeable lens 14. The imaging lens 40 includes a focus lens 40A. The focus lens 40A moves in an optical axis direction in accordance with a manual rotation operation of the focus ring 13, and the image of the subject light is formed on the light receiving surface 44A at a focal position corresponding to a subject distance. The "focal position" here refers to a position of the focus lens 40A on the optical axis L1 in a focused state.

A finder switching lever 18 is disposed on a front surface of the imaging apparatus main body 12. An optical image visually recognizable by the OVF and a live view image that is an electronic image visually recognizable by the EVF are switched by rotationally moving the finder switching lever 18 in a direction of arrow SW. The "live view image" here refers to a motion picture image for displaying obtained by imaging the subject by the imaging element 44. The live view image is generally referred to as a live preview image.

A release button 20 and a dial 22 are disposed on an upper surface of the imaging apparatus main body 12. The dial 22 is operated in a case of setting an operation mode of an imaging system, an operation mode of a playback system, and the like.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10, an imaging mode and a playback mode are selectively set as an operation mode in accordance with an instruction of a user. The imaging mode is broadly divided into a display motion picture imaging mode and a recording imaging mode.

The display motion picture imaging mode is an operation mode in which the live view image of a plurality of consecutive frames obtained by consecutive imaging is displayed on a first display 32 and/or a second display 86 (refer to FIG. 3) described later.

The recording imaging mode is broadly divided into a still picture image capturing mode and a motion picture image capturing mode. The still picture image capturing mode is an operation mode in which a still picture image obtained by imaging the subject by the imaging apparatus 10 is recorded, and the motion picture image capturing mode is an operation mode in which a motion picture image obtained by imaging the subject by the imaging apparatus 10 is recorded.

The recording imaging mode is an operation mode in which the live view image is displayed on the first display 32 and/or the second display 86 described later, and in which recording image data is recorded on a secondary storage device 80 (refer to FIG. 3) described later and/or a memory card or the like. The recording image data is broadly divided into still picture image data and motion picture image data. The still picture image data is image data obtained in the still picture image capturing mode, and the motion picture image data is image data obtained in the motion picture image capturing mode.

In a case where the imaging mode is set, first, the imaging apparatus 10 is set to the display motion picture imaging mode. In the display motion picture imaging mode, in a case where the push operation is performed on the release button 20, the imaging apparatus 10 transitions to the recording imaging mode from the display motion picture imaging mode.

In the imaging mode, an MF mode and an AF mode are selectively set in accordance with an instruction of the user. In the auto focus mode, an imaging condition is adjusted by setting the release button 20 to the half push state. Then, in a case where the full push state is subsequently set, exposure is performed. That is, by setting the release button 20 to the half push state, an AE function is operated, and an exposure state is set. Then, an AF function is operated, and a focusing control is performed. In a case where the release button 20 is set to the full push state, imaging is performed.

Figure 2:
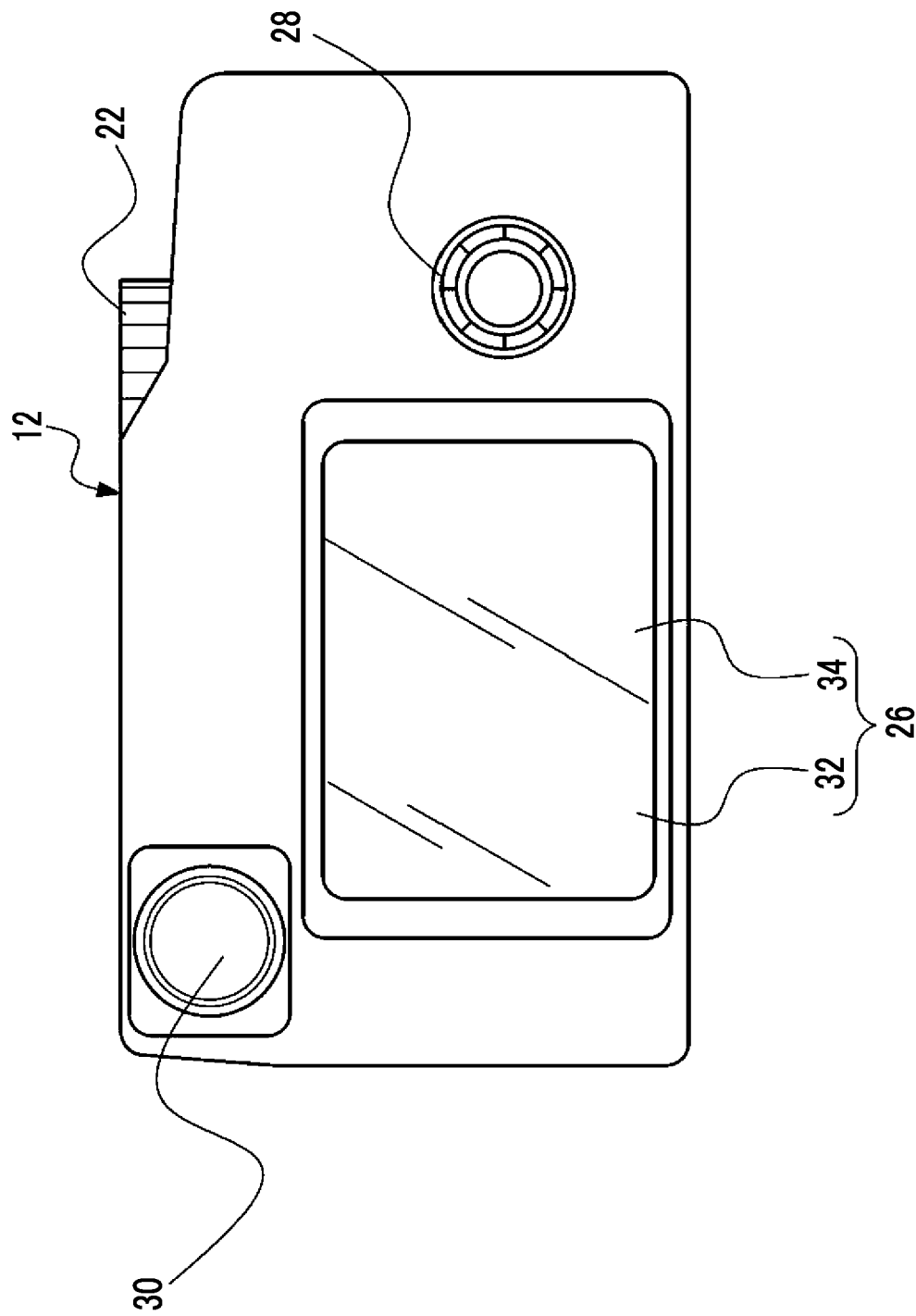
FIG. 2 is a schematic rear view illustrating an example of the imaging apparatus according to the first to fourth embodiments.

As illustrated in FIG. 2 as an example, a touch panel display 26, an instruction key 28, and a finder eyepiece portion 30 are disposed on a rear surface of the imaging apparatus main body 12.

Figure 3:
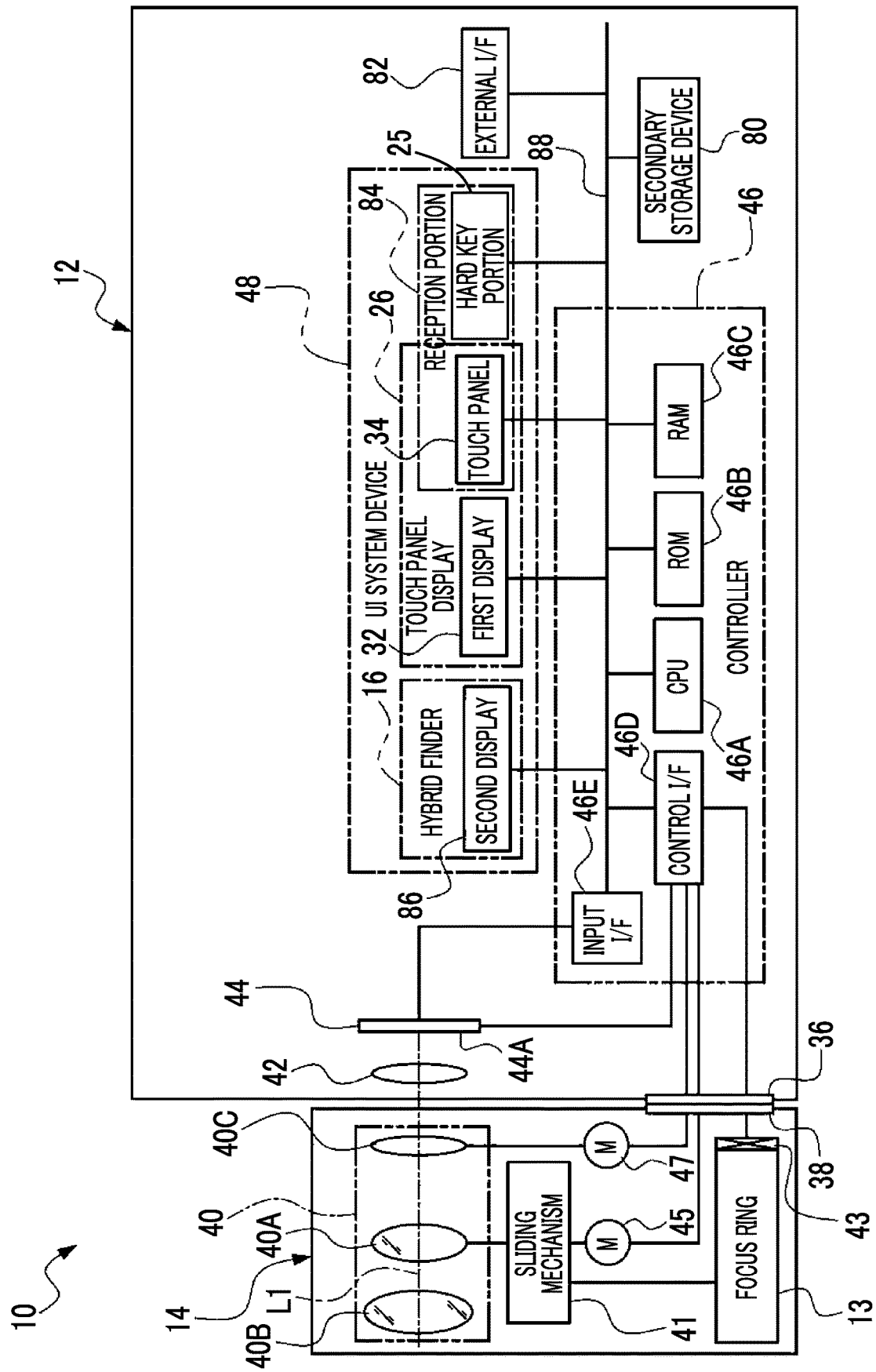
FIG. 3 is a block diagram illustrating an example of a hardware configuration of an electric system of the imaging apparatus according to the first to fourth embodiments.

The touch panel display 26 comprises the first display 32 and a touch panel 34 (refer to FIG. 3). A liquid crystal display or an organic EL display is illustrated as the first display 32.

The first display 32 displays images, text information, and the like. The first display 32 is used for displaying the live view image which is obtained by consecutive imaging in a case where the imaging apparatus 10 is in the imaging mode. In addition, the first display 32 is used for displaying a still picture image obtained by imaging in a case where a still picture image capturing instruction is provided. Furthermore, the first display 32 is used for displaying a playback image and displaying a menu screen and the like in a case where the imaging apparatus 10 is in the playback mode.

The touch panel 34 is a transmissive touch panel and is overlaid on a surface of a display region of the first display 32. The touch panel 34 senses a contact by an instruction object such as a finger or a stylus pen and outputs a sensing result to a predetermined output destination such as the CPU 46A (refer to FIG. 3) described later.

The instruction key 28 receives various instructions such as selection of one or a plurality of menus, confirmation of a selected content, deletion of the selected content, zooming, and frame advance.

As illustrated in FIG. 3 as an example, the imaging apparatus 10 comprises mounts 36 and 38. The mount 36 is disposed in the imaging apparatus main body 12. The mount 38 is disposed in the interchangeable lens 14 at a position corresponding to a position of the mount 36. The interchangeable lens 14 is interchangeably mounted on the imaging apparatus main body 12 by joining the mount 38 to the mount 36.

As illustrated in FIG. 3 as an example, the imaging lens 40 comprises an objective lens 40B and a stop 40C in addition to the focus lens 40A. The focus lens 40A, the objective lens 40B, and the stop 40C are arranged in an order of the objective lens 40B, the focus lens 40A, and the stop 40C along the optical axis L1 from a subject side to an imaging apparatus main body 12 side.

The imaging lens 40 includes a sliding mechanism 41 and motors 45 and 47. The motor 47 is connected to the stop 40C. The stop 40C adjusts exposure by operating in response to motive power provided from the motor 47.

The sliding mechanism 41 moves the focus lens 40A along the optical axis L1 by receiving motive power. The motor 45 and the focus ring 13 are connected to the sliding mechanism 41. Motive power from the motor 45 or motive power obtained by operating the focus ring 13 is provided to the sliding mechanism 41. That is, the sliding mechanism 41 moves the focus lens 40A along the optical axis L1 in accordance with the motive power from the motor 45 or the motive power obtained by operating the focus ring 13.

The motors 45 and 47 are connected to the imaging apparatus main body 12 through the mounts 36 and 38, and driving of the motors 45 and 47 is controlled in accordance with a command from the imaging apparatus main body 12. In the present embodiment, stepping motors are applied as an example of the motors 45 and 47. Accordingly, the motors 45 and 47 operate in synchronization with pulse electric power in accordance with the command from the imaging apparatus main body 12. While an example of disposing the motors 45 and 47 in the imaging lens 40 is illustrated in the example illustrated in FIG. 3, the technology of the present disclosure is not limited thereto. At least one of the motors 45 and 47 may be disposed in the imaging apparatus main body 12.

A rotary encoder 43 is disposed in the imaging apparatus main body 12. The rotary encoder 43 is connected to the imaging apparatus main body 12 through the mounts 36 and 38. The rotary encoder 43 detects a position of the focus ring 13 and outputs a detection result to the imaging apparatus main body 12.

The imaging apparatus main body 12 comprises a mechanical shutter 42. The mechanical shutter 42 operates by receiving motive power from a driving source (not illustrated) such as a motor under control of the CPU 46A described later. In a case where the interchangeable lens 14 is mounted on the imaging apparatus main body 12 through the mounts 36 and 38, the subject light is transmitted through the imaging lens 40, and the image of the subject light is formed on the light receiving surface 44A through the mechanical shutter 42.

The imaging apparatus main body 12 comprises a controller 46 and a UI system device 48. The controller 46 controls the entire imaging apparatus 10. The UI system device 48 is a device that presents information to the user or receives an instruction from the user. The UI system device 48 is connected to the controller 46 through a busline 88. The controller 46 acquires various types of information from the UI system device 48 and controls the UI system device 48.

The controller 46 comprises a CPU 46A, a ROM 46B, a RAM 46C, a control I/F 46D, and an input I/F 46E. The CPU 46A, the ROM 46B, the RAM 46C, the control I/F 46D, and the input I/F 46E are connected to each other through the busline 88.

The ROM 46B stores various programs. The CPU 46A reads out the various programs from the ROM 46B and loads the read various programs into the RAM 46C. The CPU 46A controls the entire imaging apparatus 10 in accordance with the various programs loaded in the RAM 46C.

The control I/F 46D is a device including an FPGA and is connected to the imaging element 44. The CPU 46A controls the imaging element 44 through the control I/F 46D. In addition, the control I/F 46D is connected to the motors 45 and 47 through the mounts 36 and 38, and the CPU 46A controls the motors 45 and 47 through the control I/F 46D. Furthermore, the control I/F 46D is connected to the rotary encoder 43 through the mounts 36 and 38, and the CPU 46A specifies the position of the focus ring 13 based on the detection result input from the rotary encoder 43.

The secondary storage device 80 and an external I/F 82 are connected to the busline 88. The secondary storage device 80 is a non-volatile memory such as a flash memory, an SSD, an HDD, or an EEPROM. The CPU 46A reads out and writes various types of information in the secondary storage device 80.

The external I/F 82 is a device including an FPGA. An external apparatus (not illustrated) such as a USB memory and a memory card is connected to the external I/F 82. The external I/F 82 exchanges various types of information between the CPU 46A and the external apparatus.

The CPU 46A stores thinned image data 69B1 (refer to FIG. 6) described later in the secondary storage device 80 and/or the external apparatus. The CPU 46A is an example of a "storage control portion (storage control processor)" according to the embodiments of the technology of the present disclosure. In addition, the secondary storage device 80 and the external apparatus are an example of a "storage device" according to the embodiments of the technology of the present disclosure.

The UI system device 48 comprises the hybrid finder 16, the touch panel display 26, and a reception portion 84. The first display 32 and the touch panel 34 are connected to the busline 88. Accordingly, the CPU 46A displays various types of information on the first display 32 and operates in accordance with various instructions received by the touch panel 34.

The reception portion 84 comprises the touch panel 34 and a hard key portion 25. The hard key portion 25 includes a plurality of hard keys and includes a release button 20, a dial 22, and an instruction key 28. The hard key portion 25 is connected to the busline 88, and the CPU 46A operates in accordance with various instructions received by the hard key portion 25.

The hybrid finder 16 comprises the second display 86. The CPU 46A displays various types of information on the second display 86.

Figure 4:
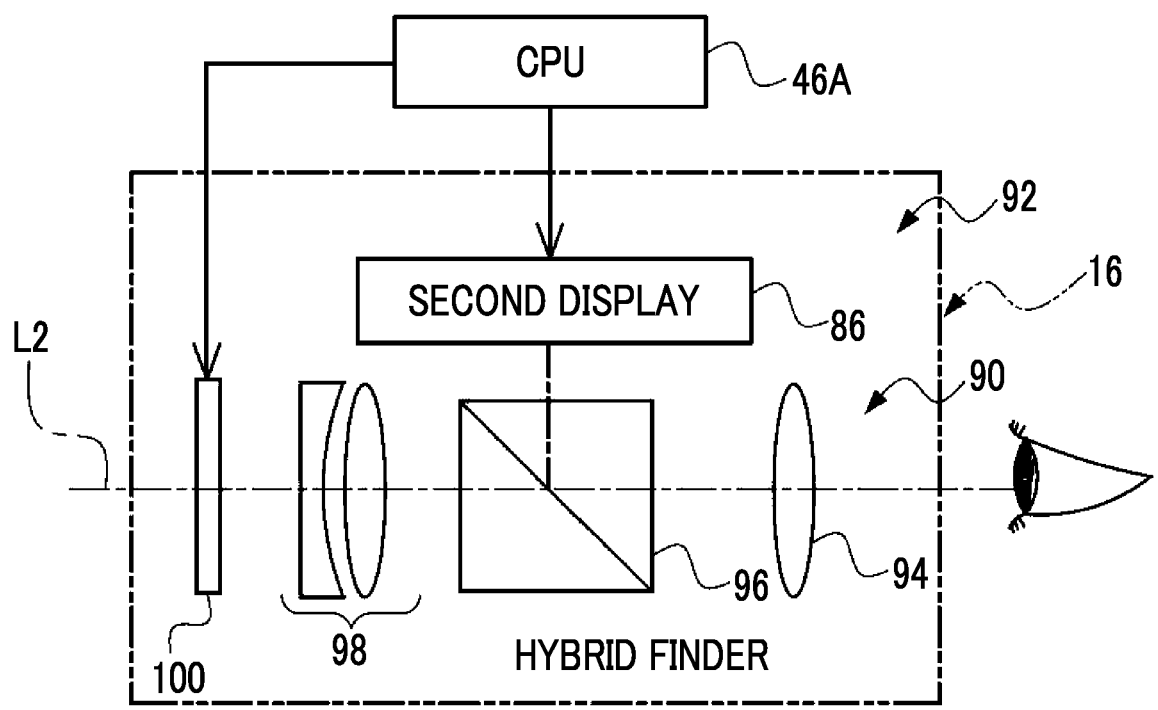
FIG. 4 is a schematic configuration diagram illustrating an example of a configuration of a hybrid finder included in the imaging apparatus according to the first to fourth embodiments.

As illustrated in FIG. 4 as an example, the hybrid finder 16 includes an OVF 90 and an EVF 92. The OVF 90 is a reverse Galilean finder and includes an eyepiece lens 94, a prism 96, and an objective lens 98. The EVF 92 includes the second display 86, the prism 96, and the eyepiece lens 94.

A liquid crystal shutter 100 is arranged closer to the subject side than the objective lens 98 along an optical axis L2 of the objective lens 98. The liquid crystal shutter 100 blocks light such that the optical image is not incident on the objective lens 98 in a case of using the EVF 92.

The prism 96 reflects and guides the electronic image or various types of information displayed on the second display 86 to the eyepiece lens 94 and combines the optical image with the electronic image and/or the various types of information displayed on the second display 86. A live view image is illustrated as an example of the electronic image displayed on the second display 86.

In a case of an OVF mode, the CPU 46A enables the optical image to be visually recognized from the eyepiece lens 94 by controlling the liquid crystal shutter 100 to a non-light blocking state. In addition, in a case of an EVF mode, the CPU 46A enables only the electronic image displayed on the second display 86 to be visually recognized from the eyepiece lens 94 by controlling the liquid crystal shutter 100 to a light blocking state.

Hereinafter, for convenience of description, the first display 32 (refer to FIG. 3) and the second display 86 will be referred to as the "display" without a reference sign unless otherwise necessary to distinguish therebetween. The display is an example of a "display portion" according to the embodiments of the technology of the present disclosure. In addition, the CPU 46A is an example of a "display control portion (display control processor)" according to the embodiments of the technology of the present disclosure.

Figure 5:
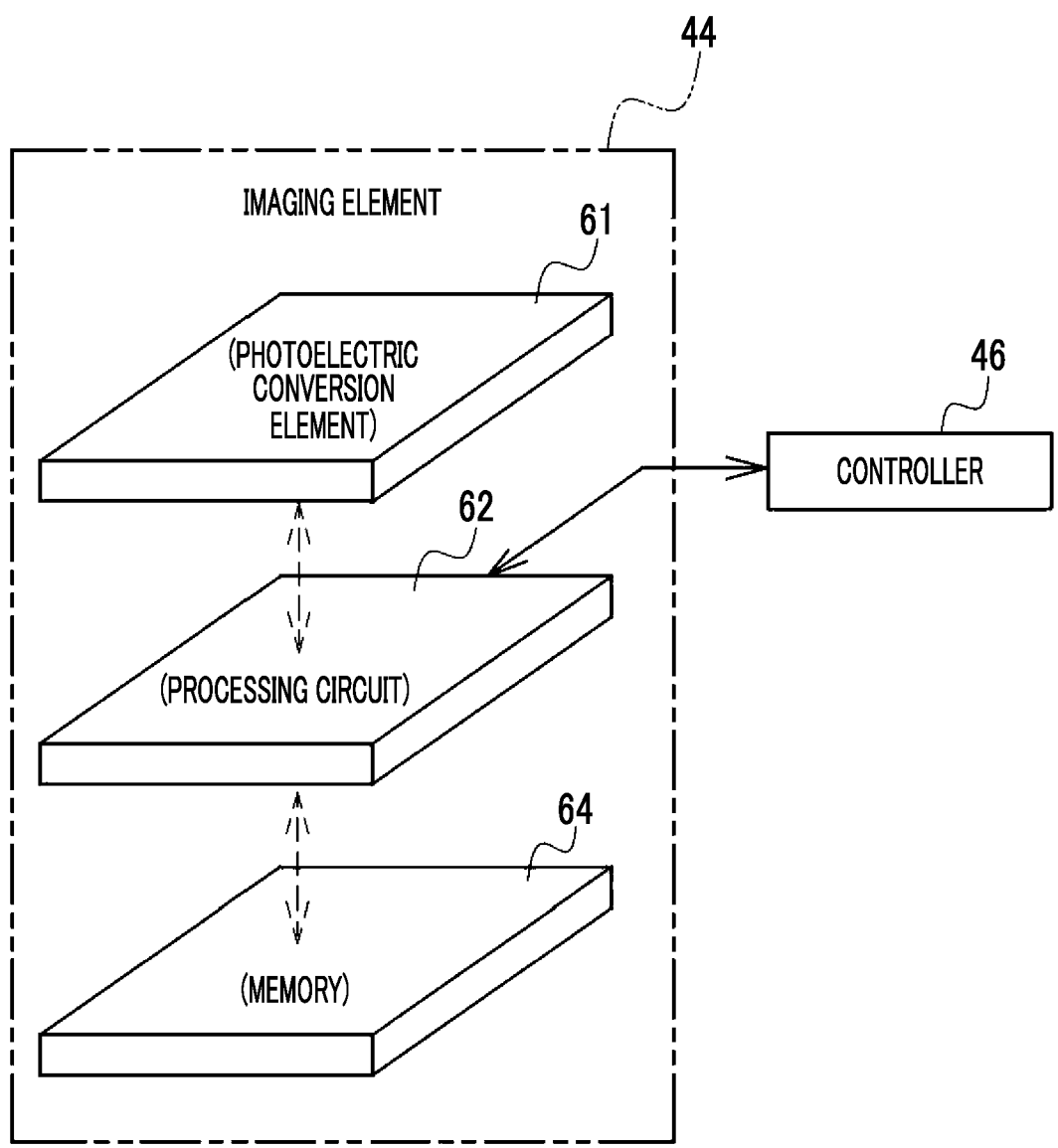
FIG. 5 is a schematic configuration diagram illustrating an example of a laminated structure of an imaging element included in the imaging apparatus according to the first to fourth embodiments.

As illustrated in FIG. 5 as an example, the imaging element 44 incorporates a photoelectric conversion element 61, a processing circuit 62, and a memory 64. The imaging element 44 is an imaging element in which the photoelectric conversion element 61, the processing circuit 62, and the memory 64 are formed in one chip. That is, the photoelectric conversion element 61, the processing circuit 62, and the memory 64 are formed in one package. In the imaging element 44, the photoelectric conversion element 61 is laminated with the processing circuit 62 and the memory 64. Specifically, the photoelectric conversion element 61 and the processing circuit 62 are electrically connected to each other by a bump (not illustrated) of copper or the like having conductivity. The processing circuit 62 and the memory 64 are also electrically connected to each other by a bump (not illustrated) of copper or the like having conductivity. The memory 64 is an example of a "storage portion" according to the embodiments of the technology of the present disclosure.

The processing circuit 62 is, for example, an LSI, and the memory 64 is, for example, a DRAM. However, the technology of the present disclosure is not limited thereto, and an SRAM may be employed as the memory 64 instead of the DRAM.

The processing circuit 62 is implemented by an ASIC and an FPGA and exchanges various types of information with the controller 46. While an example of implementing the processing circuit 62 by the ASIC and the FPGA is illustrated here, the technology of the present disclosure is not limited thereto. For example, the processing circuit 62 may be implemented by only an ASIC, a PLD, or an FPGA or may be implemented by a combination of the ASIC and the PLD or a combination of the PLD and the FPGA among the ASIC, the PLD, and the FPGA. In addition, a computer including a CPU, a ROM, and a RAM may be employed. The number of CPUs may be singular or plural. In addition, the processing circuit 62 may be implemented by a combination of a hardware configuration and a software configuration.

The photoelectric conversion element 61 includes a plurality of photodiodes arranged in a matrix form. Photodiodes of "4896×3265" pixels are illustrated as an example of the plurality of photodiodes.

The photoelectric conversion element 61 comprises color filters, and the color filters include a G filter corresponding to green (G) that most contributes to obtaining a brightness signal, an R filter corresponding to red (R), and a B filter corresponding to blue (B). In the present embodiment, the G filter, the R filter, and the B filter are arranged with a predetermined periodicity in each of a row direction (horizontal direction) and a column direction (vertical direction) for the plurality of photodiodes of the photoelectric conversion element 61. Thus, the imaging apparatus 10 can perform processing in accordance with a repeating pattern in a case of performing demosaicing and the like on R, G, and B signals. The demosaicing refers to processing of calculating every color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

The imaging element 44 has a so-called electronic shutter function and controls an electric charge accumulation time period of each photodiode in the photoelectric conversion element 61 by performing the electronic shutter function under control of the controller 46. The electric charge accumulation time period refers to a so-called shutter speed.

In the imaging apparatus 10, imaging for the still picture image and imaging for the motion picture image are performed using a rolling shutter method. The imaging for the still picture image is implemented by performing the electronic shutter function and operating the mechanical shutter 42 (refer to FIG. 3). The imaging for the the motion picture is implemented by performing the electronic shutter function without operating the mechanical shutter 42. While the rolling shutter method is illustrated here, the technology of the present disclosure is not limited thereto. A global shutter method may be applied instead of the rolling shutter method.

As illustrated in FIG. 6 as an example, the processing circuit 62 includes a reading circuit 62A, a digital processing circuit 62B, an image processing circuit 62C, an output circuit 62D, and a control circuit 62E. The reading circuit 62A, the digital processing circuit 62B, the image processing circuit 62C, and the control circuit 62E are implemented by ASICs, and the output circuit 62D is implemented by an FPGA. The image processing circuit 62C and the control circuit 62E are an example of a "processing portion" according to the embodiments of the technology of the present disclosure, and the output circuit 62D is an example of an "output portion" according to the embodiments of the technology of the present disclosure and is an example of a "processor" according to the embodiments of the technology of the present disclosure.

The control circuit 62E is connected to the controller 46. Specifically, the control circuit 62E is connected to the control I/F 46D (refer to FIG. 3) of the controller 46 and controls the entire imaging element 44 in accordance with an instruction of the CPU 46A (refer to FIG. 3).

The reading circuit 62A is connected to the photoelectric conversion element 61, the digital processing circuit 62B, and the control circuit 62E. The digital processing circuit 62B is connected to the control circuit 62E. The memory 64 is connected to the digital processing circuit 62B, the image processing circuit 62C, and the control circuit 62E. The image processing circuit 62C is connected to the control circuit 62E.

The output circuit 62D is connected to the control circuit 62E and the controller 46. Specifically, the output circuit 62D is connected to the input I/F 46E (refer to FIG. 3) of the controller 46.

The reading circuit 62A reads out analog captured image data 69A that is signal electric charges accumulated in the photoelectric conversion element 61, from the photoelectric conversion element 61 under control of the control circuit 62E. Specifically, the reading circuit 62A reads out the captured image data 69A for each frame in accordance with a vertical synchronization signal input from the control circuit 62E. In addition, the reading circuit 62A reads out the captured image data 69A for each row in accordance with a horizontal synchronization signal input from the control circuit 62E within a reading period of one frame.

The digital processing circuit 62B digitizes the analog captured image data 69A by performing signal processing of correlative double sampling processing and then, A/D conversion on the analog captured image data 69A read out by the reading circuit 62A. The digital processing circuit 62B stores captured image data 69B obtained by digitizing the captured image data 69A in the memory 64. Hereinafter, the captured image data 69A and 69B will be referred to as "captured image data 69" unless otherwise necessary to distinguish therebetween.

The memory 64 is a memory that can store image data of a plurality of frames. The memory 64 has a storage region (not illustrated) in units of pixels. The image data is stored in a corresponding storage region of the memory 64 in units of pixels by the digital processing circuit 62B. In the example illustrated in FIG. 6, the memory 64 stores the captured image data 69B.

The image processing circuit 62C performs processing using the captured image data 69B. Specifically, the image processing circuit 62C acquires the captured image data 69B from the memory 64 and performs various types of signal processing on the acquired captured image data 69B. The "various types of signal processing" here include not only well-known signal processing such as tone correction, white balance adjustment, sharpness adjustment, gamma correction, and gradation correction but also signal processing according to the embodiments of the technology of the present disclosure. As will be described in detail later, for example, the signal processing according to the embodiments of the technology of the present disclosure refers to signal processing performed by an image data acquisition portion 62C1, a thinned image data generation portion 62C2, and a focusing evaluation value calculation portion 62C3 illustrated in FIG. 8.

The image processing circuit 62C generates the thinned image data 69B1 by performing the various types of signal processing on the captured image data 69A and outputs the generated thinned image data 69B1 to the control circuit 62E. The control circuit 62E stores the input thinned image data 69B1 in the memory 64. The thinned image data 69B1 is an example of "output image data" according to the embodiments of the technology of the present disclosure.

The output circuit 62D outputs the thinned image data 69B1 based on the captured image data 69B, depending on a result of the various types of signal processing performed by the image processing circuit 62C. Specifically, the control circuit 62E acquires the thinned image data 69B1 from the memory 64 and outputs the acquired thinned image data 69B1 to the output circuit 62D. The output circuit 62D outputs the thinned image data 69B1 input from the control circuit 62E to the controller 46.

In the imaging element 44, the subject is imaged at an imaging frame rate, and the thinned image data 69B1 is output to the controller 46 at an output frame rate. The imaging frame rate is an example of a "first frame rate" according to the embodiments of the technology of the present disclosure, and the output frame rate is an example of a "second frame rate" according to the embodiments of the technology of the present disclosure.

The "imaging" here refers to processing from a start of exposure of one frame in the photoelectric conversion element 61 to storage of the captured image data 69B of one frame in the memory 64. In addition, the "imaging frame rate" here is a frame rate that is applied to processing performed from the start of the exposure of one frame in the photoelectric conversion element 61 to transfer of the captured image data 69B obtained by the exposure of one frame to the output circuit 62D. In other words, the imaging frame rate is a frame rate applied to the imaging performed in cooperation among the photoelectric conversion element 61, the reading circuit 62A, the digital processing circuit 62B, the control circuit 62E, and the memory 64.

Meanwhile, the "output frame rate" here is a frame rate that is applied to the output of the thinned image data 69B1 to the controller 46 by the output circuit 62D. A frame rate used in a device in a rear stage of the imaging element 44 is a frame rate that is the same as the output frame rate.

The imaging frame rate and the output frame rate may have a relationship of "imaging frame rate≥output frame rate". For example, the imaging frame rate may be a frame rate at which imaging of eight frames is performed within a period T as illustrated in FIG. 7A, and the output frame rate may be a frame rate at which three frames are output within the period T as illustrated in FIG. 7B.

In the present embodiment, 120 frames per second (fps) is employed as the imaging frame rate. In addition, the output frame rate is a changeable frame rate. A high frame rate is a frame rate that is higher than a low frame rate and lower than the imaging frame rate (refer to FIG. 7A). Here, 60 fps is applied as an example of the high frame rate, and 20 fps is applied as an example of the low frame rate.

Figure 8:
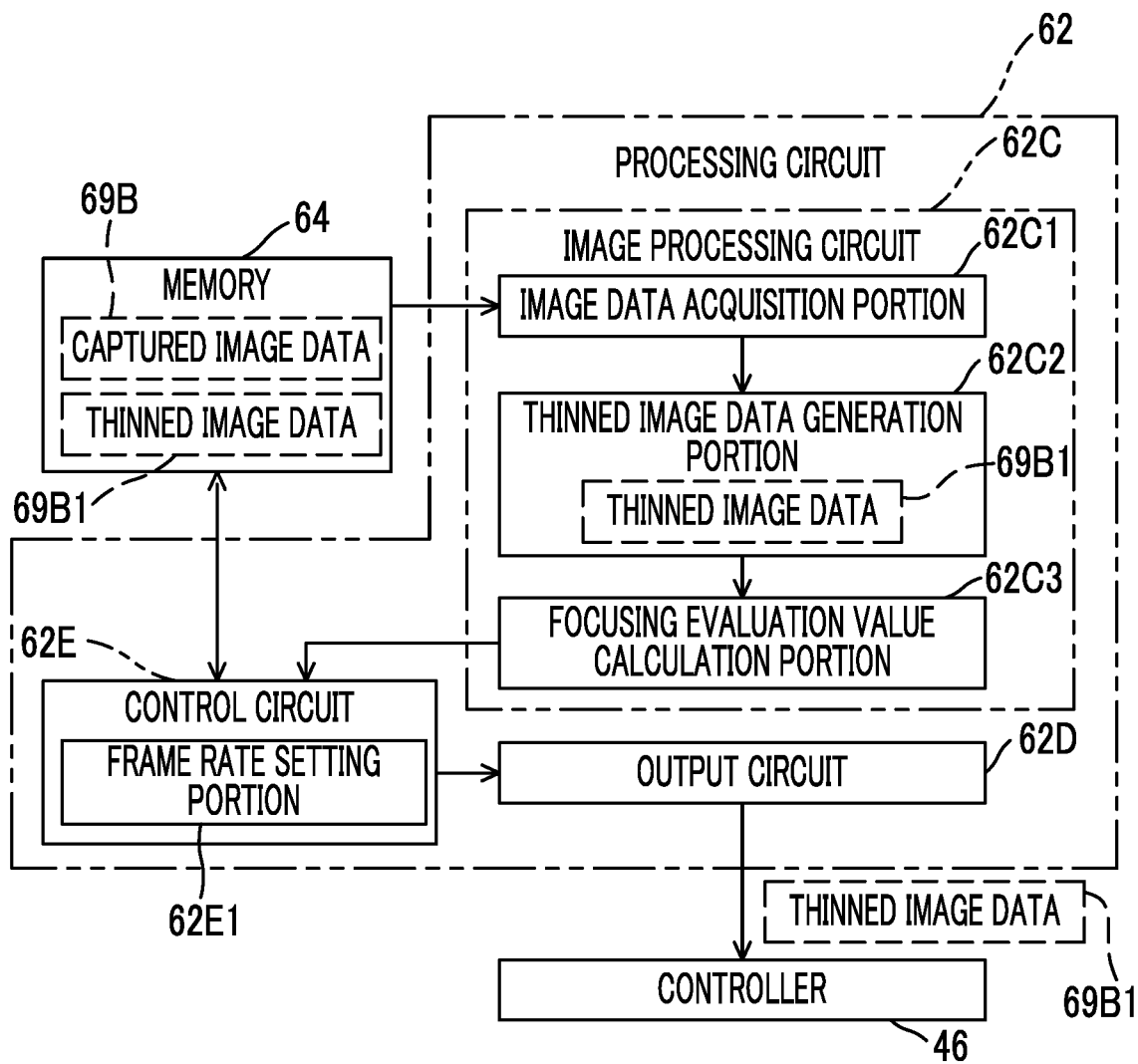
FIG. 8 is a block diagram illustrating an example of a configuration of a processing circuit included in the imaging element of the imaging apparatus according to the first embodiment.

As illustrated in FIG. 8 as an example, the image processing circuit 62C includes the image data acquisition portion 62C1, the thinned image data generation portion 62C2, and the focusing evaluation value calculation portion 62C3. The image data acquisition portion 62C1 is connected to the memory 64 and acquires the captured image data 69B from the memory 64. The thinned image data generation portion 62C2 is connected to the image data acquisition portion 62C1 and generates the thinned image data 69B1 by performing thinning processing described later on the captured image data 69B acquired by the image data acquisition portion 62C1. The focusing evaluation value calculation portion 62C3 is connected to the thinned image data generation portion 62C2 and calculates a focusing evaluation value indicating a degree of focusing (hereinafter, simply referred to as the "focusing evaluation value") for the thinned image data 69B1 generated by the thinned image data generation portion 62C2. The "focusing evaluation value" here is an example of an "evaluation value" according to the embodiments of the technology of the present disclosure.

The control circuit 62E is connected to the focusing evaluation value calculation portion 62C3 and acquires the thinned image data 69B1 of a calculation target of the focusing evaluation value calculation portion 62C3 for the focusing evaluation value from the focusing evaluation value calculation portion 62C3. The control circuit 62E stores the thinned image data 69B1 acquired from the focusing evaluation value calculation portion 62C3 in the memory 64. Accordingly, the memory 64 stores the captured image data 69B input from the digital processing circuit 62B and the thinned image data 69B1 input from the control circuit 62E.

In addition, the control circuit 62E reads out the thinned image data 69B1 from the memory 64 and outputs the read thinned image data 69B1 to the output circuit 62D.

The control circuit 62E includes a frame rate setting portion 62E1. As will be described in detail later, the frame rate setting portion 62E1 sets the high frame rate or the low frame rate as the output frame rate.

Figure 9:
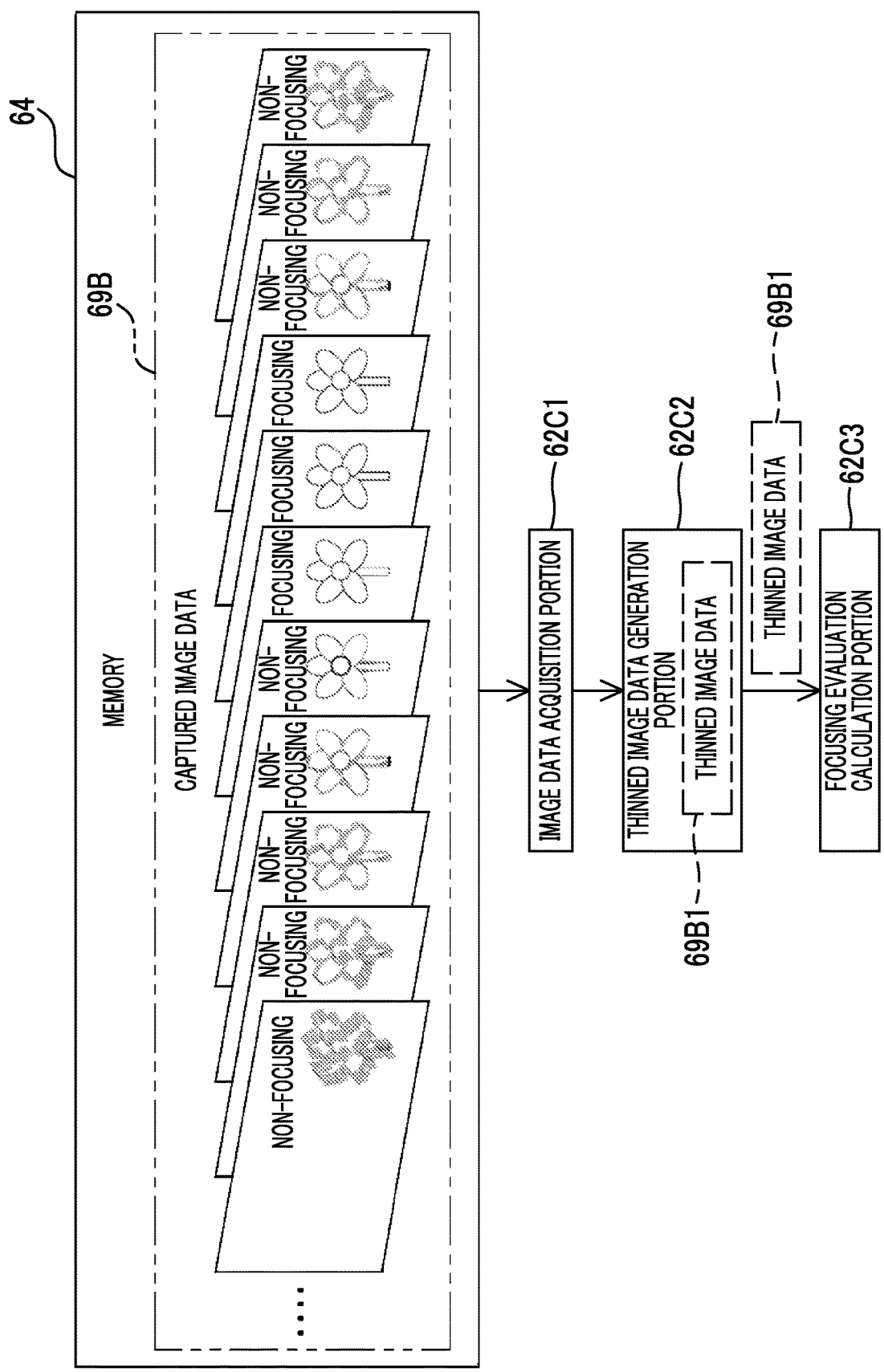
FIG. 9 is a conceptual diagram for describing a memory, an image data acquisition portion, a thinned image data generation portion, and a focusing evaluation value calculation portion illustrated in FIG. 8.

As illustrated in FIG. 9 as an example, the memory 64 stores the captured image data 69B of a plurality of frames. In the example illustrated in FIG. 9, an aspect in which the captured image data 69B of the plurality of frames obtained by imaging in the MF mode is stored in time series in the memory 64 is illustrated. Specifically, in the example illustrated in FIG. 9, non-focusing image data and focusing image data are stored in the memory 64. The non-focusing image data refers to the captured image data 69B obtained by imaging in a non-focused state, and the focusing image data refers to the captured image data 69B obtained by imaging in a focused state.

The captured image data 69B is input and output in the memory 64 using an FIFO method, and each time the captured image data 69B is stored in the memory 64, the image data acquisition portion 62C1 acquires the captured image data 69B output from the memory 64.

The thinned image data generation portion 62C2 performs the thinning processing on the captured image data 69B acquired by the image data acquisition portion 62C1. Specifically, the thinned image data generation portion 62C2 performs the thinning processing on each captured image data 69B acquired by the image data acquisition portion 62C1 and outputs the thinned image data 69B1 to the focusing evaluation value calculation portion 62C3.

Figure 10:
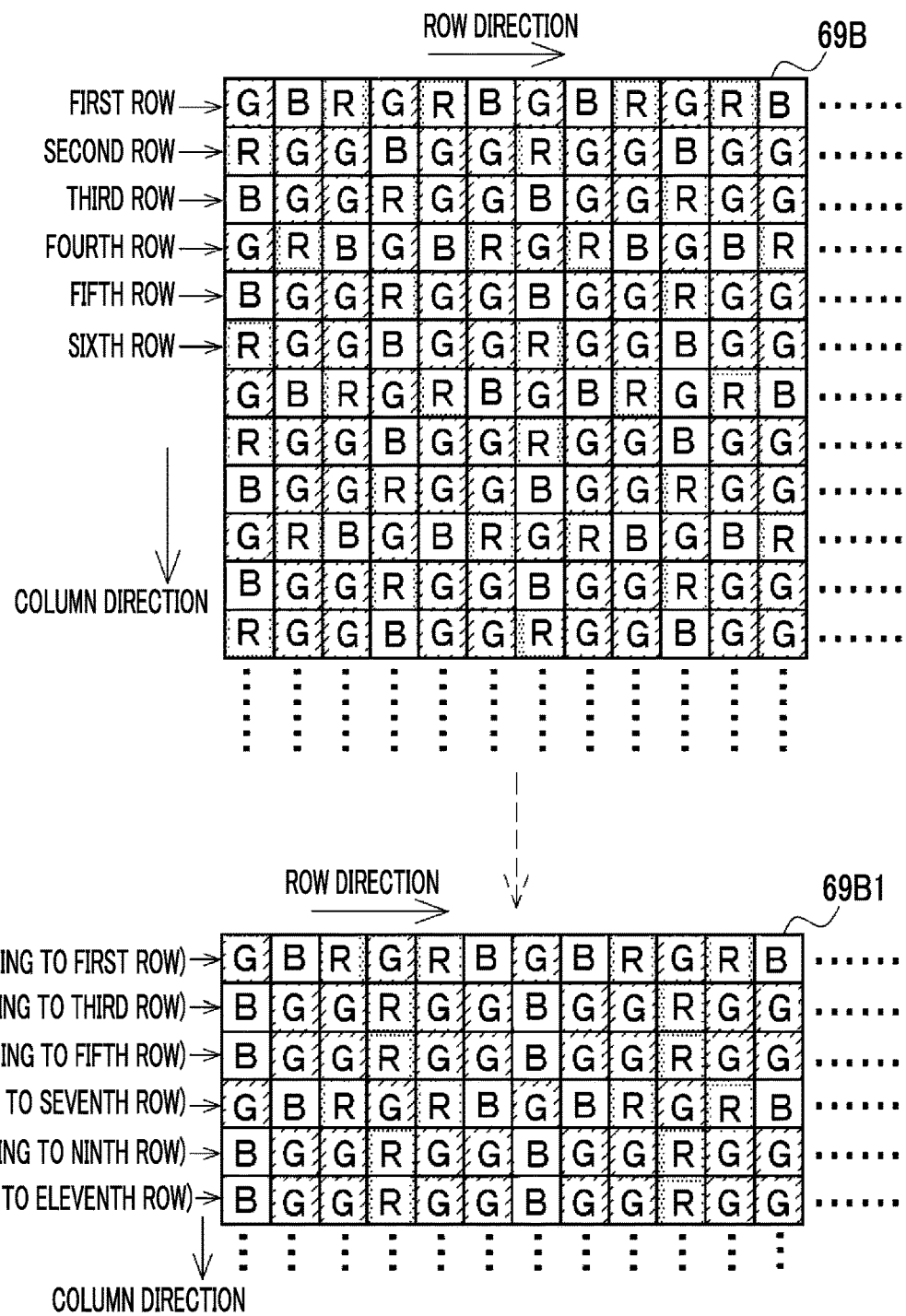
FIG. 10 is a conceptual diagram illustrating an example of a data structure of each of the captured image data and thinned image data obtained by imaging performed by the imaging element included in the imaging apparatus according to the first to fourth embodiments.

The thinning processing is processing of compressing the captured image data 69B by thinning out pixels from the captured image data 69B. As illustrated in FIG. 10 as an example, the captured image data 69B is color image data including R pixels, G pixels, and B pixels. The captured image data 69B is image data in which a plurality of primary color pixels are periodically arranged. Specifically, in the captured image data 69B, the R pixels, the G pixels, and the B pixels are arranged with periodicity corresponding to X-Trans (registered trademark) arrangement.

In the example illustrated in FIG. 10, in a first row, the R pixels, the G pixels, and the B pixels are arranged in circulation in an order of the G pixel, the B pixel, the R pixel, the G pixel, the R pixel, and the B pixel in a row direction. In addition, in a second row, the R pixels, the G pixels, and the B pixels are arranged in circulation in an order of the R pixel, the G pixel, the G pixel, the B pixel, the G pixel, and the G pixel in the row direction. In addition, in a third row, the R pixels, the G pixels, and the B pixels are arranged in circulation in an order of the B pixel, the G pixel, the G pixel, the R pixel, the G pixel, and the G pixel in the row direction. In addition, in a fourth row, the R pixels, the G pixels, and the B pixels are arranged in circulation in an order of the G pixel, the R pixel, the B pixel, the G pixel, the B pixel, and the R pixel in the row direction. In addition, in a fifth row, the R pixels, the G pixels, and the B pixels are arranged in circulation in an order of the B pixel, the G pixel, the G pixel, the R pixel, the G pixel, and the G pixel in the row direction. Furthermore, in a sixth row, the R pixels, the G pixels, and the B pixels are arranged in circulation in an order of the R pixel, the G pixel, the G pixel, the B pixel, the G pixel, and the G pixel in the row direction. An arrangement pattern of the R pixels, the G pixels, and the B pixels of the entire captured image data 69B is formed by repetition of an arrangement pattern of the R pixels, the G pixels, and the B pixels of the first row to the sixth row in units of six rows in a column direction.

The thinned image data 69B1 is image data obtained by performing the thinning processing on the captured image data 69B in units of rows. Specifically, as illustrated in FIG. 10 as an example, the thinned image data 69B1 is image data indicating a vertically ½ thinned image obtained by thinning out pixels of lines of even-numbered rows in the column direction from a captured image indicated by the captured image data 69B. That is, pixels of each row of the vertically ½ thinned image are pixels corresponding to pixels of odd-numbered rows of the captured image.

Figure 11:
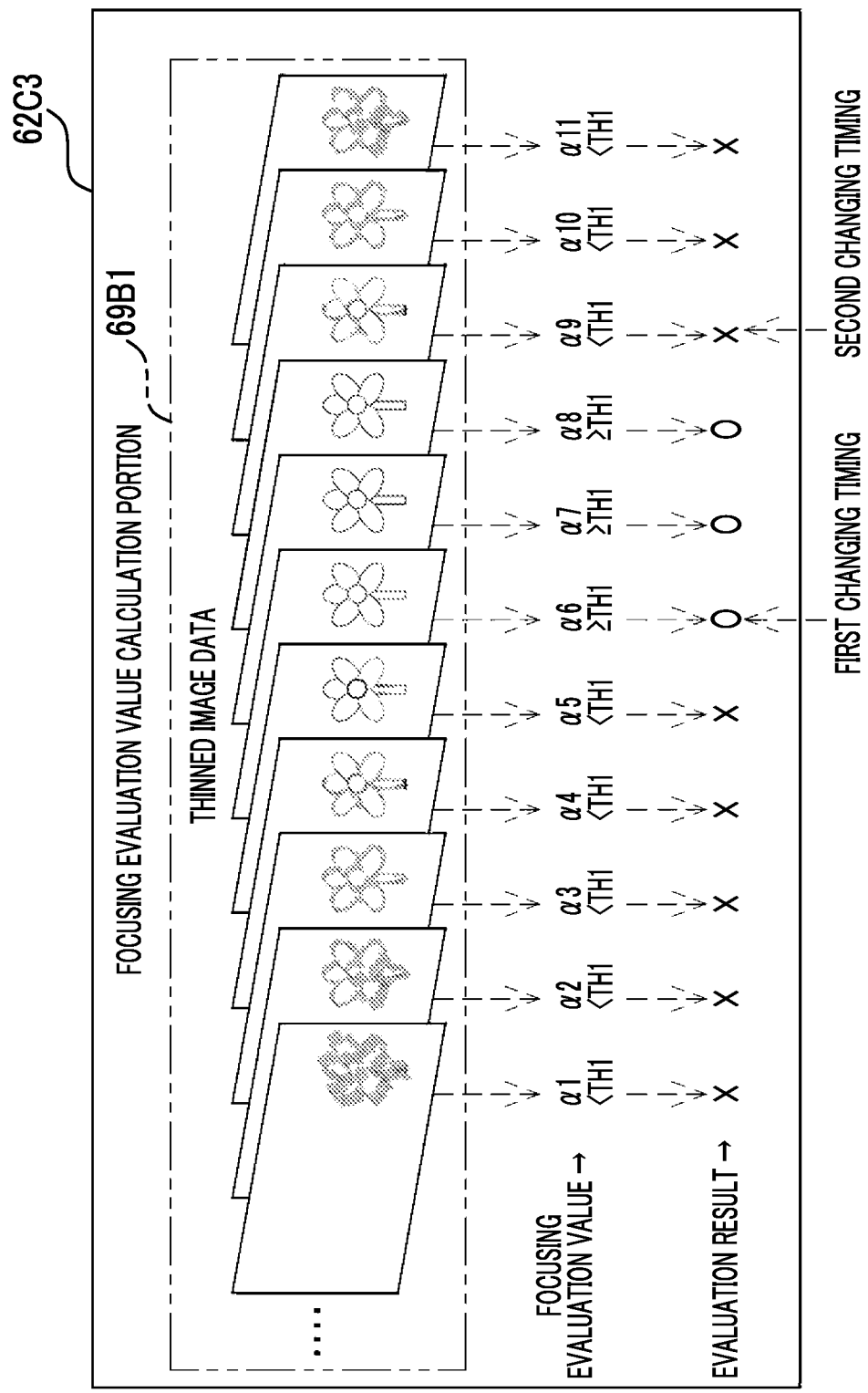
FIG. 11 is a conceptual diagram for describing a content of processing performed by the focusing evaluation value calculation portion illustrated in FIG. 8.

As illustrated in FIG. 11 as an example, the focusing evaluation value calculation portion 62C3 calculates the focusing evaluation value by targeting each thinned image data 69B1 generated by the thinned image data generation portion 62C2.

Figure 12:
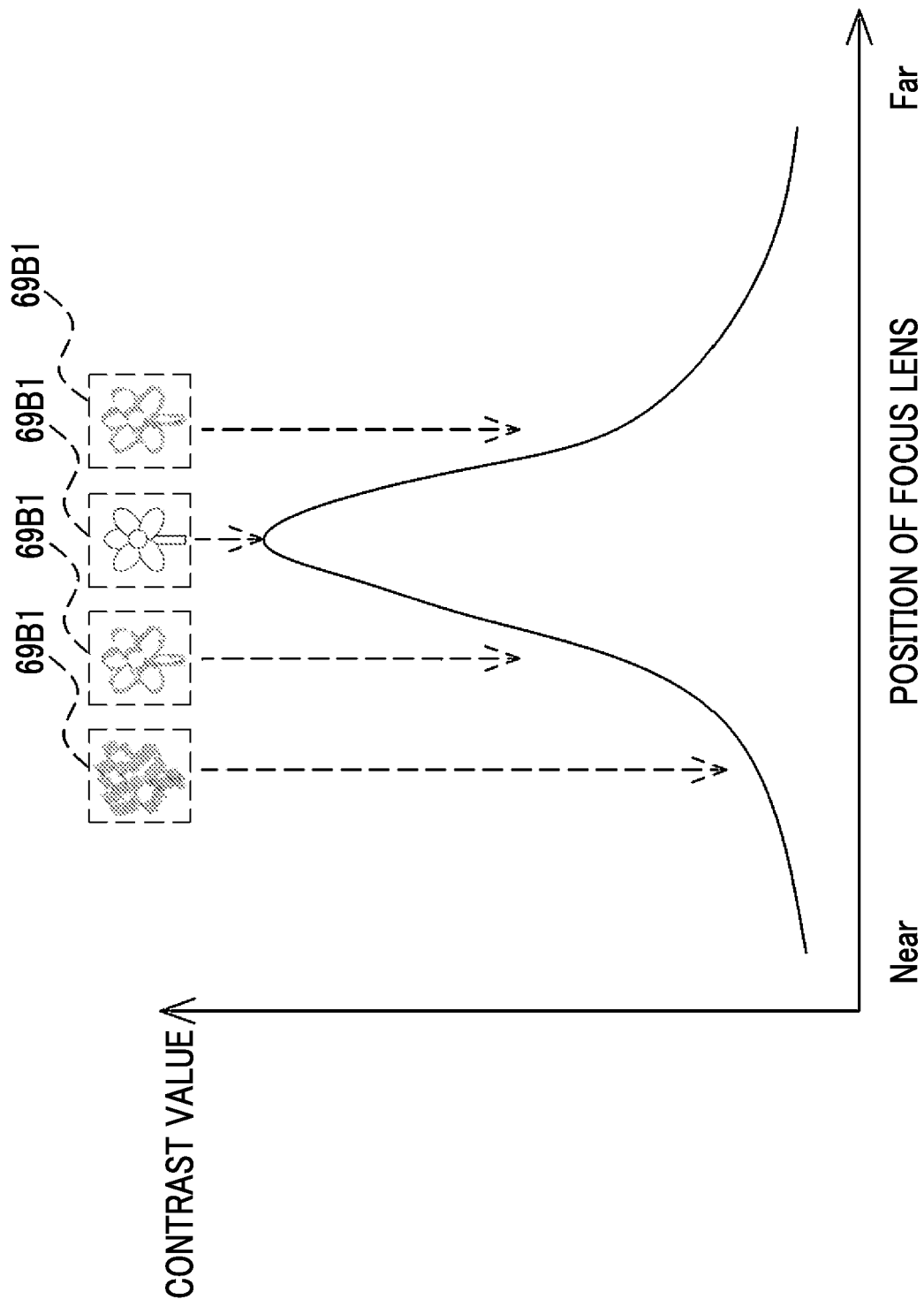
FIG. 12 is a graph illustrating an example of a relationship between a contrast value calculated as a focusing evaluation value and a position of a focus lens.

In the focusing evaluation value calculation portion 62C3, a contrast value of an image indicated by the thinned image data 69B1 is illustrated as the focusing evaluation value (refer to FIG. 12). In the example illustrated in FIG. 11, $\alpha 1$ to $\alpha 11$ are illustrated as the focusing evaluation value for each frame of the thinned image data 69B1. The focusing evaluation value calculation portion 62C3 determines whether or not the focusing evaluation value is greater than or equal to a threshold value TH1, by comparing each of $\alpha 1$ to $\alpha 11$ as the focusing evaluation value with the threshold value TH1. The threshold value TH1 is an example of first to fifth threshold values according to the embodiments of the technology of the present disclosure. The threshold value TH1 may be a fixed value or a variable value that can be changed in accordance with an instruction received by the reception portion 84 (refer to FIG. 3).

In a case where the focusing evaluation value is greater than or equal to the threshold value TH1, the focusing evaluation value calculation portion 62C3 determines that the thinned image data of the calculation target for the focusing evaluation value is the focusing image data. In addition, in a case where the focusing evaluation value is less than the threshold value TH1, the focusing evaluation value calculation portion 62C3 determines that the thinned image data of the calculation target for the focusing evaluation value is the non-focusing image data. By determining whether or not the focusing evaluation value is greater than or equal to the threshold value TH1, the focusing evaluation value calculation portion 62C3 derives an evaluation result obtained by evaluating the degree of focusing for the thinned image data 69B1.

In the example illustrated in FIG. 11, as the evaluation result, "○" denoting the focused state is illustrated for the focusing image data, and "x" denoting the non-focused state is illustrated for the non-focusing image data.

In the first embodiment, a timing of a change in evaluation result from "x" to "○" is a first changing timing, and a timing of a change in evaluation result from "○" to "x" is a second changing timing. The first changing timing refers to a timing of a change in output frame rate from the low frame rate to the high frame rate. The second changing timing refers to a timing of a change in output frame rate from the high frame rate to the low frame rate.

As illustrated in FIG. 12 as an example, the contrast value used as the focusing evaluation value changes depending on the position of the focus lens 40A, and the position of the focus lens 40A in a case where the contrast value is the highest is the focal position. As the position of the focus lens 40A moves away from the focal position, the contrast value is decreased, and blurriness of the image is increased.

Figure 13:
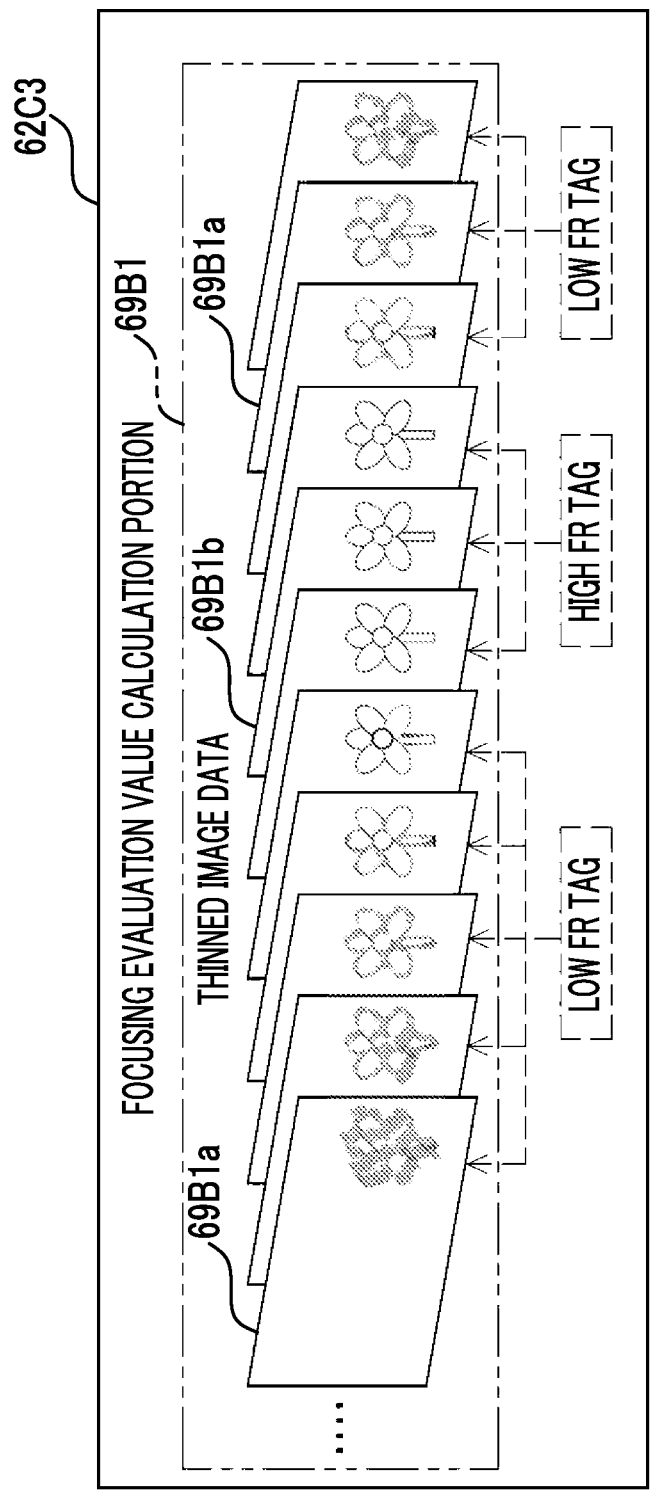
FIG. 13 is a conceptual diagram for describing a content of processing of assigning an FR tag to the thinned image data as processing performed by the focusing evaluation value calculation portion illustrated in FIG. 8.

As illustrated in FIG. 13 as an example, the focusing evaluation value calculation portion 62C3 assigns a low FR tag to the thinned image data 69B1 for which the evaluation result is "x" (refer to FIG. 11), and assigns a high FR tag to the thinned image data 69B1 for which the evaluation result is "○" (refer to FIG. 11). Here, "the abbreviation "FR" stands for "Frame Rate". The low FR tag is a tag for issuing an instruction to set the low frame rate as the output frame rate, and the high FR tag is a tag for issuing an instruction to set the high frame rate as the output frame rate.

By assigning the low FR tag or the high FR tag to the thinned image data 69B1, the thinned image data 69B1 is broadly divided into low FR tag-assigned thinned image data 69B1a and high FR tag-assigned thinned image data 69B1b.

Hereinafter, for convenience of description, the low FR tag and the high FR tag will be referred to as an "FR tag" unless otherwise necessary to distinguish therebetween. In addition, hereinafter, for convenience of description, the low FR tag-assigned thinned image data 69B1a and the high FR tag-assigned thinned image data 69B1b will be referred to as "tag-assigned thinned image data" without a reference sign unless otherwise necessary to distinguish therebetween.

Figure 14:
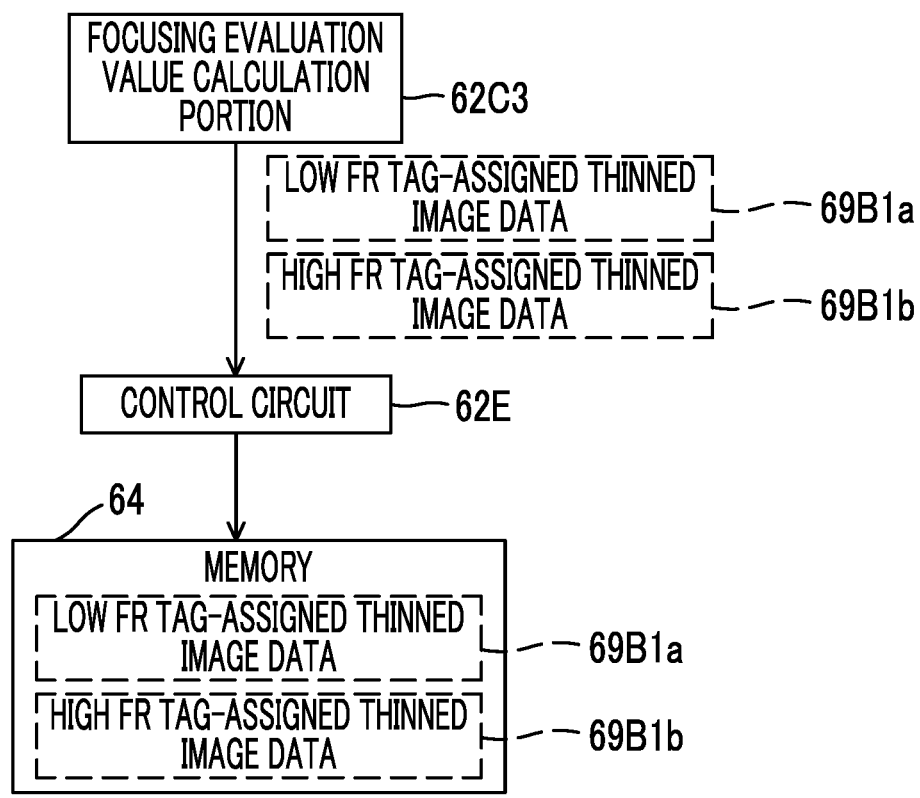
FIG. 14 is a conceptual diagram for describing the focusing evaluation value calculation portion, a control circuit, and the memory illustrated in FIG. 8.

As illustrated in FIG. 14 as an example, the focusing evaluation value calculation portion 62C3 outputs the low FR tag-assigned thinned image data 69B1a and the high FR tag-assigned thinned image data 69B1b to the control circuit 62E. The control circuit 62E stores the low FR tag-assigned thinned image data 69B1a and the high FR tag-assigned thinned image data 69B1b input from the focusing evaluation value calculation portion 62C3 in the memory 64. The memory 64 stores the thinned image data 69B1 in correspondence with the time series of the captured image data 69B. That is, the low FR tag-assigned thinned image data 69B1a or the high FR tag-assigned thinned image data 69B1b that is in a correspondence relationship in time series with each captured image data 69B stored in time series in the memory 64 is stored in the memory 64 in association with the captured image data 69B.

Figure 15:
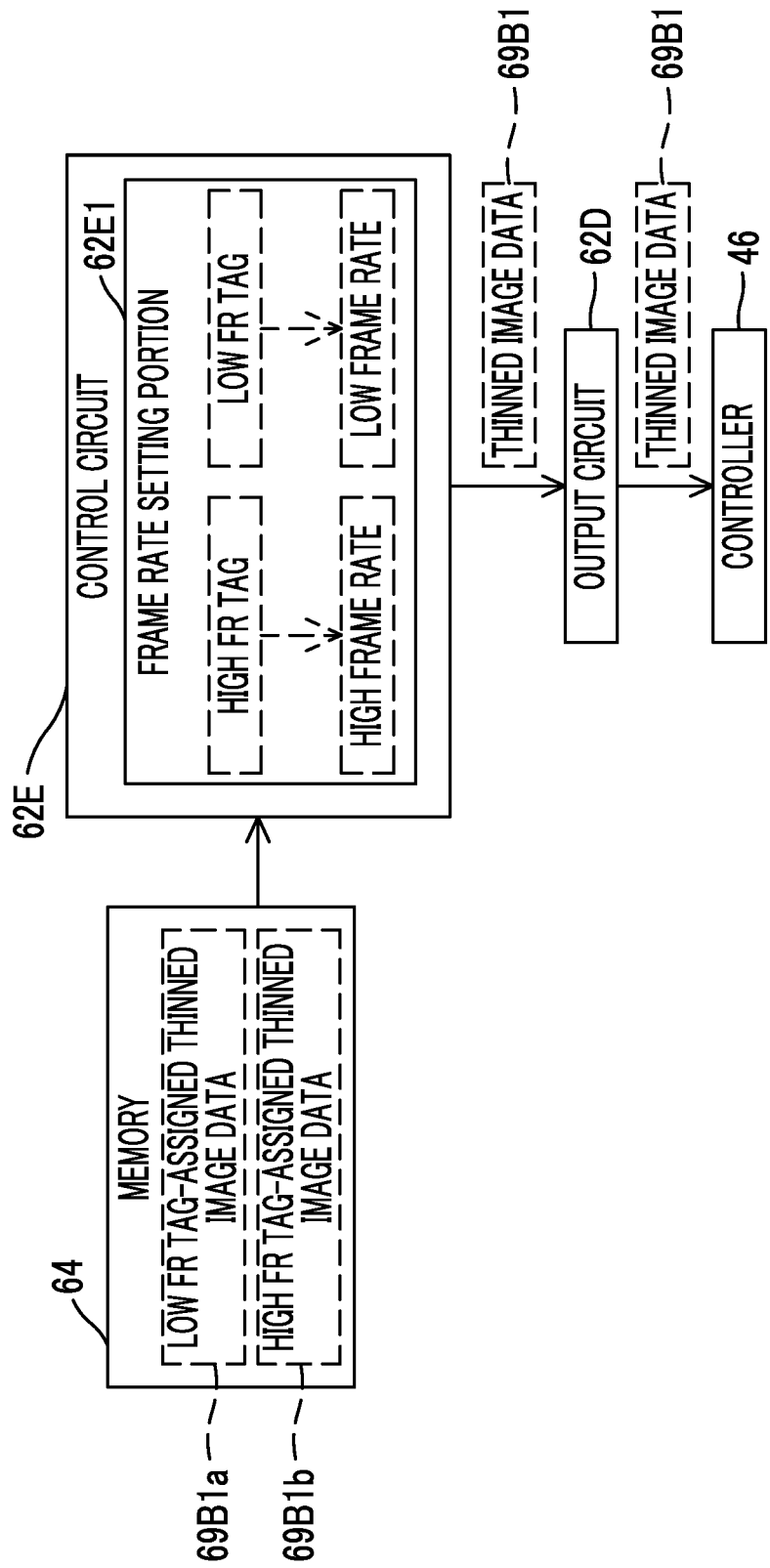
FIG. 15 is a conceptual diagram for describing the memory, the control circuit, an output circuit, and a controller illustrated in FIG. 8.

As illustrated in FIG. 15 as an example, the control circuit 62E acquires the thinned image data 69B1 in time series from the memory 64 and transfers the acquired thinned image data 69B1 to the output circuit 62D.

The thinned image data 69B1 acquired from the memory 64 by the control circuit 62E is the low FR tag-assigned thinned image data 69B1a or the high FR tag-assigned thinned image data 69B1b. In the control circuit 62E, in a case where the thinned image data 69B1 is acquired from the memory 64, the frame rate setting portion 62E1 determines whether the low FR tag is assigned or the high FR tag is assigned to the acquired thinned image data 69B1. That is, the frame rate setting portion 62E1 determines whether the acquired thinned image data 69B1 is the low FR tag-assigned thinned image data 69B1a or the high FR tag-assigned thinned image data 69B1b.

In a case where the acquired thinned image data 69B1 is the low FR tag-assigned thinned image data 69B1a, the frame rate setting portion 62E1 sets the low frame rate as the output frame rate for the output circuit 62D. In a case where the acquired thinned image data 69B1 is the high FR tag-assigned thinned image data 69B1b, the frame rate setting portion 62E1 sets the high frame rate as the output frame rate for the output circuit 62D.

Here, setting of the low frame rate includes a meaning of maintaining the low frame rate in addition to a meaning of changing the high frame rate to the low frame rate. That is, in a state where the low frame rate is already set as the output frame rate, in a case where the low FR tag-assigned thinned image data 69B1a is input into the control circuit 62E, the frame rate setting portion 62E1 maintains setting of the low frame rate. Setting of the high frame rate includes a meaning of maintaining the high frame rate in addition to a meaning of changing the low frame rate to the high frame rate. That is, in a state where the high frame rate is already set as the output frame rate, in a case where the high FR tag-assigned thinned image data 69B1b is input into the control circuit 62E, the frame rate setting portion 62E1 maintains setting of the high frame rate.

That is, the frame rate setting portion 62E1 changes the output frame rate from the low frame rate to the high frame rate at a timing of a change from the low FR tag-assigned thinned image data 69B1a to the high FR tag-assigned thinned image data 69B1b. In addition, the frame rate setting portion 62E1 changes the output frame rate from the high frame rate to the low frame rate at a timing of a change from the high FR tag-assigned thinned image data 69B1b to the low FR tag-assigned thinned image data 69B1a.

The output circuit 62D outputs the thinned image data 69B1 transferred from the control circuit 62E to the controller 46 at the output frame rate set by the frame rate setting portion 62E1. In the first embodiment, the output circuit 62D excludes the FR tag from the low FR tag-assigned thinned image data 69B1a and the high FR tag-assigned thinned image data 69B1b and outputs the thinned image data 69B obtained by excluding the FR tag to the controller 46. However, the technology of the present disclosure is not limited thereto. For example, the output circuit 62D may output the low FR tag-assigned thinned image data 69B1a and the high FR tag-assigned thinned image data 69B1*b* having the FR tag to the controller 46 without excluding the FR tag.

Figure 16:
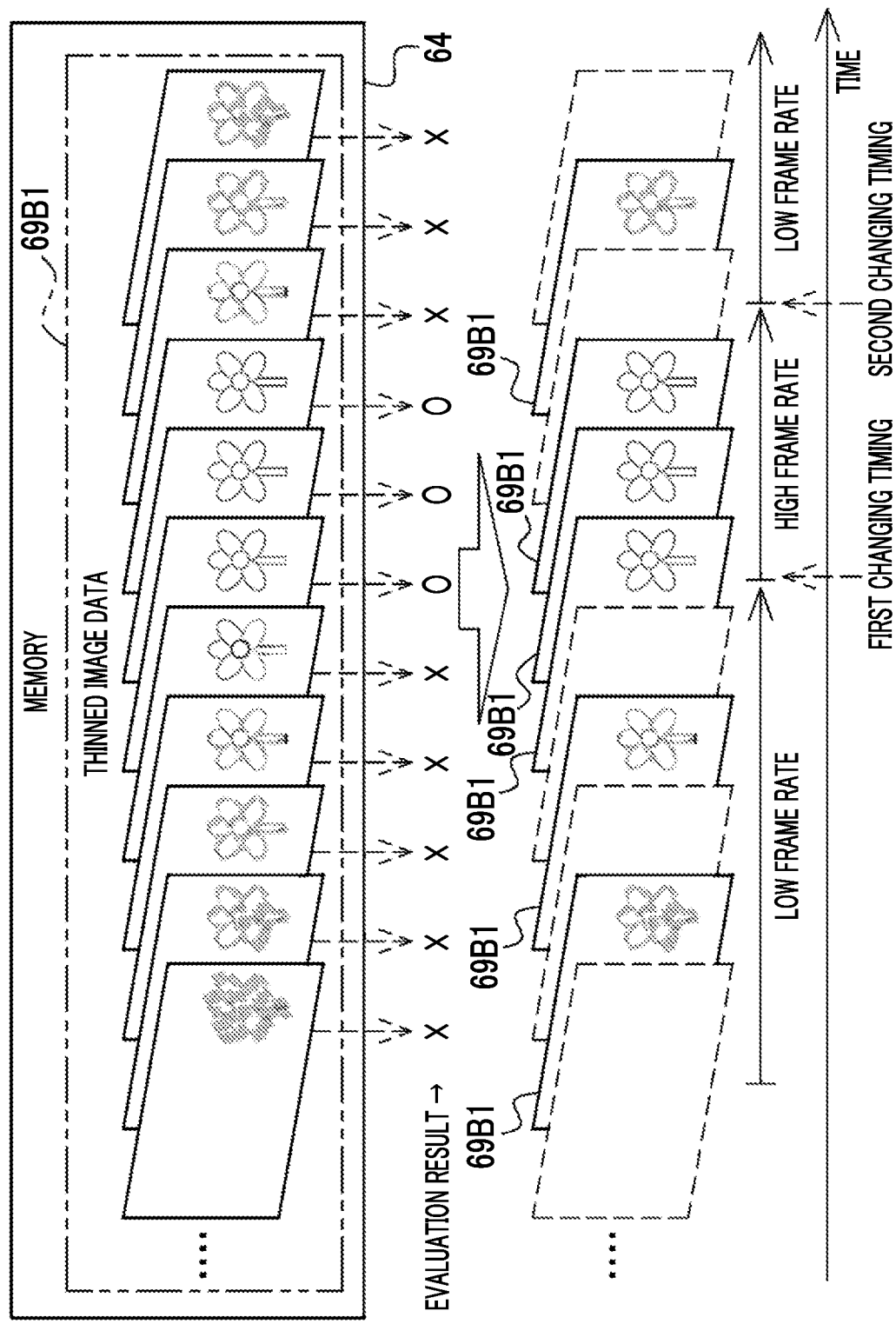
FIG. 16 is a conceptual diagram illustrating an example of a relationship among the thinned image data of a plurality of frames stored in time series in the memory by imaging a subject in an MF mode in the imaging apparatus according to the first embodiment, an evaluation result for each frame, and the output frame rate.

FIG. 16 illustrates a conceptual diagram illustrating an example of a relationship among the thinned image data 69B1 of the plurality of frames stored in time series in the memory 64 by imaging the subject in the MF mode, the evaluation result for each frame, and the output frame rate. As illustrated in FIG. 16 as an example, the thinned image data 69B1 for which the evaluation result is "x" is output at the low frame rate, and the thinned image data 69B1 for which the evaluation result is "○" is output at the high frame rate. The timing of the change in evaluation result from "x" to "○" is the first changing timing, and the output frame rate is changed from the low frame rate to the high frame rate at the first changing timing. In addition, the timing of the change in evaluation result from "○" to "x" is the second changing timing, and the output frame rate is changed from the high frame rate to the low frame rate at the second changing timing.

Figure 17:
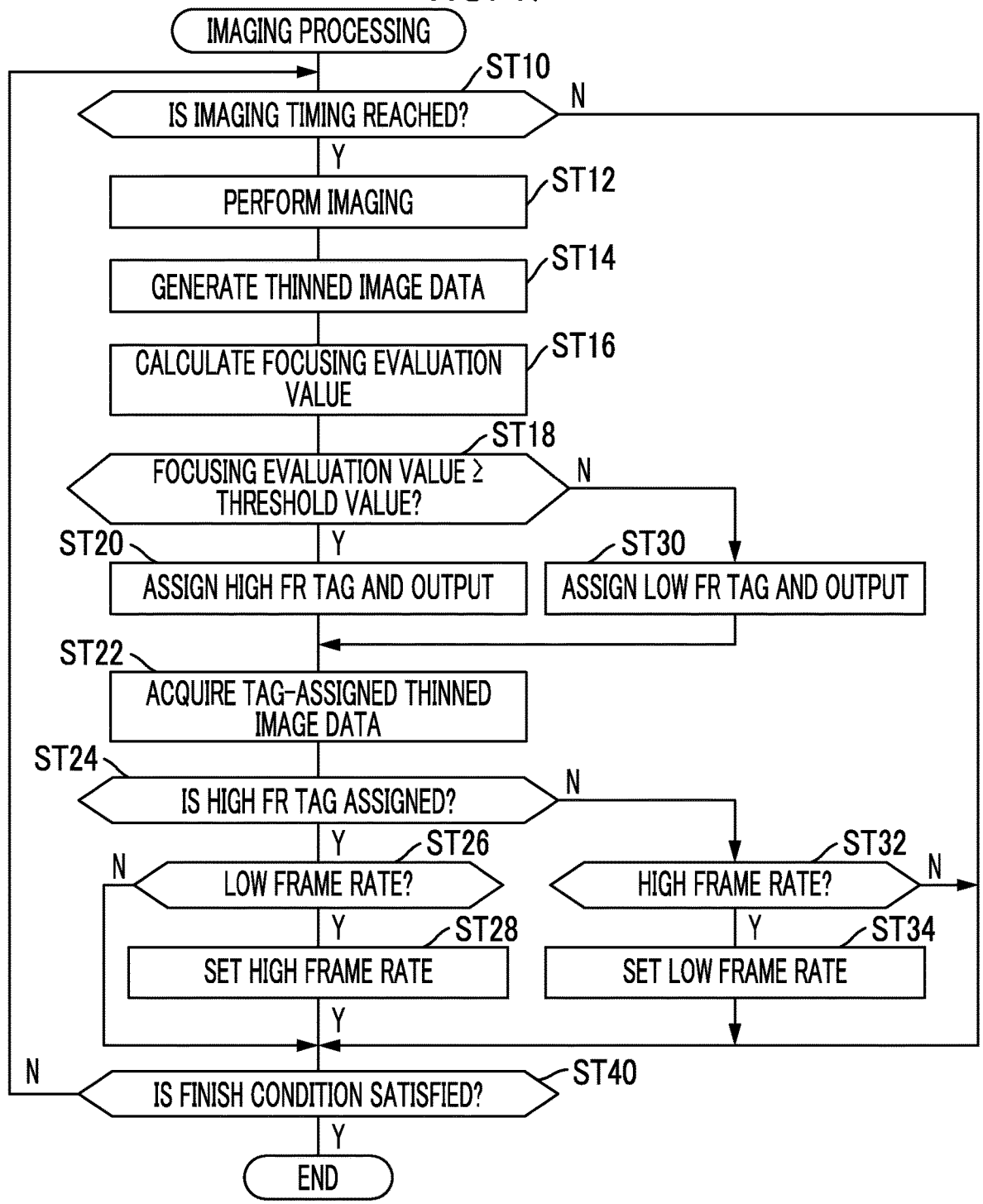
FIG. 17 is a flowchart illustrating an example of a flow of imaging processing according to the first embodiment.

Next, an action of the imaging apparatus 10 will be described with reference to FIG. 17. FIG. 17 illustrates an example of a flow of imaging processing executed by the processing circuit 62 of the imaging element 44.

In the imaging processing illustrated in FIG. 17, first, in step ST10, the control circuit 62E determines whether or not a timing (hereinafter, referred to as an "imaging timing") at which imaging is started is reached. The imaging timing is a timing that is periodically defined by the imaging frame rate. In step ST10, in a case where the imaging timing is not reached, a negative determination is made, and the imaging processing transitions to step ST40. In step ST10, in a case where the imaging timing is reached, a positive determination is made, and the imaging processing transitions to step ST12.

In step ST12, the control circuit 62E performs imaging by controlling the processing circuit 62 and the memory 64. That is, by executing processing of step ST12, first, the reading circuit 62A causes the photoelectric conversion element 61 to perform the exposure of one frame. Next, the reading circuit 62A reads out the captured image data 69A of one frame from the photoelectric conversion element 61. Next, the digital processing circuit 62B digitizes the captured image data 69A by performing signal processing of the correlative double sampling processing and then, the A/D conversion on the captured image data 69A read out by the reading circuit 62A. The digital processing circuit 62B stores the captured image data 69B obtained by digitization in the memory 64.

In subsequent step ST14, the image data acquisition portion 62C1 acquires the captured image data 69B from the memory 64. The thinned image data generation portion 62C2 generates the thinned image data 69B1 by performing the thinning processing on the captured image data 69B acquired by the image data acquisition portion 62C1.

In subsequent step ST16, the focusing evaluation value calculation portion 62C3 calculates the focusing evaluation value for the thinned image data 69B1 generated in step ST14.

In subsequent step ST18, the focusing evaluation value calculation portion 62C3 determines whether or not the focusing evaluation value calculated in step ST16 is greater than or equal to the threshold value TH1. In step ST18, in a case where the focusing evaluation value is greater than or equal to the threshold value TH1, a positive determination is made, and the imaging processing transitions to step ST20. In step ST18, in a case where the focusing evaluation value is less than the threshold value TH1, a negative determination is made, and the imaging processing transitions to step ST30.

In step ST20, the focusing evaluation value calculation portion 62C3 generates the high FR tag-assigned thinned image data 69B1*b* by assigning the high FR tag to the thinned image data 69B1 and outputs the generated high FR tag-assigned thinned image data 69B1*b* to the control circuit 62E. After processing of step ST20 is executed, the imaging processing transitions to step ST22.

In step ST30, the focusing evaluation value calculation portion 62C3 generates the low FR tag-assigned thinned image data 69B1*a* by assigning the low FR tag to the thinned image data 69B1 and outputs the generated low FR tag-assigned thinned image data 69B1*a* to the control circuit 62E. After processing of step ST30 is executed, the imaging processing transitions to step ST22.

The control circuit 62E stores the tag-assigned thinned image data which is input by executing processing of step ST20 and step ST30, in time series in the memory 64.

In step ST22, the control circuit 62E acquires the tag-assigned thinned image data in time series from the memory 64. Then, the imaging processing transitions to step ST24. The tag-assigned thinned image data acquired in step ST22 is transferred to the output circuit 62D.

In step ST24, the frame rate setting portion 62E1 determines whether or not the tag-assigned thinned image data acquired in step ST22 is the high FR tag-assigned thinned image data 69B1*b*. In step ST24, in a case where the tag-assigned thinned image data acquired in step ST22 is the high FR tag-assigned thinned image data 69B1*b*, a positive determination is made, and the imaging processing transitions to step ST26. In step ST24, in a case where the tag-assigned thinned image data acquired in step ST22 is the low FR tag-assigned thinned image data 69B1*a*, a negative determination is made, and the imaging processing transitions to step ST32.

In step ST26, the frame rate setting portion 62E1 determines whether or not the low frame rate is currently set as the output frame rate. In step ST26, in a case where the low frame rate is currently set as the output frame rate, a positive determination is made, and the imaging processing transitions to step ST28. In step ST26, in a case where the high frame rate is currently set as the output frame rate, a negative determination is made, and the imaging processing transitions to step ST40.

In step ST28, the frame rate setting portion 62E1 sets the high frame rate as the output frame rate. Then, the imaging processing transitions to step ST40.

In step ST32, the frame rate setting portion 62E1 determines whether or not the high frame rate is currently set as the output frame rate. In step ST32, in a case where the high frame rate is currently set as the output frame rate, a positive determination is made, and the imaging processing transitions to step ST34. In step ST32, in a case where the low frame rate is currently set as the output frame rate, a negative determination is made, and the imaging processing transitions to step ST40.

In step ST34, the frame rate setting portion 62E1 sets the low frame rate as the output frame rate. Then, the imaging processing transitions to step ST40.

In a case where the output frame rate is set in such a manner, the output circuit 62D excludes the FR tag from the tag-assigned thinned image data transferred from the control circuit 62E and outputs the thinned image data 69B1 obtained by excluding the FR tag to the controller 46 at the currently set output frame rate.

In step ST40, the control circuit 62E determines whether or not a condition (hereinafter, referred to as an "imaging processing finish condition") under which the imaging processing is finished is satisfied. For example, a condition that an instruction to finish the imaging processing is received by the reception portion 84 is illustrated as the imaging processing finish condition. In step ST40, in a case where the imaging processing finish condition is not satisfied, a negative determination is made, and the imaging processing transitions to step ST10. In step ST40, in a case where the imaging processing finish condition is satisfied, the imaging processing is finished.

As described above, in the imaging element 44, the focusing evaluation value for the thinned image data 69B1 is calculated by the focusing evaluation value calculation portion 62C3. The output frame rate is changed based on the focusing evaluation value. Accordingly, power consumption required for outputting the thinned image data 69B1 can be reduced, compared to a case of outputting every thinned image data 69B1.

In addition, in the imaging element 44, a change from the low frame rate to the high frame rate is made at a timing (the first changing timing) at which the focusing evaluation value changes from less than the threshold value TH1 to greater than or equal to the threshold value TH1. In addition, a change from the high frame rate to the low frame rate is made at a timing (the second changing timing) of a change in focusing evaluation value from greater than or equal to the threshold value TH1 to less than the threshold value TH1.

Accordingly, an output data amount of the thinned image data 69B1 for which the focusing evaluation value is less than the threshold value TH1 is smaller than the output data amount of the thinned image data 69B1 for which the focusing evaluation value is greater than or equal to the threshold value TH1. Accordingly, the power consumption required for outputting the thinned image data 69B1 can be reduced, compared to a case of outputting every thinned image data 69B1.

In addition, in the imaging element 44, the focusing evaluation value is calculated by targeting the thinned image data 69B1. Thus, a load exerted on calculation of the focusing evaluation value is reduced, compared to a case of calculating the focusing evaluation value by targeting the captured image data 69B. Accordingly, power consumption in the imaging element 44 can be reduced, compared to a case of calculating the focusing evaluation value by targeting the captured image data 69B.

In addition, the imaging element 44 is an imaging element in which the photoelectric conversion element 61, the processing circuit 62, and the memory 64 are formed in one chip. Accordingly, portability of the imaging element 44 is increased, compared to an imaging element in which the photoelectric conversion element 61, the processing circuit 62, and the memory 64 are not formed in one chip. In addition, a degree of design freedom can be increased, compared to a case of the imaging element in which the photoelectric conversion element 61, the processing circuit 62, and the memory 64 are not formed in one chip. Furthermore, it is possible to contribute to size reduction of the imaging apparatus main body 12, compared to a case of the imaging element in which the photoelectric conversion element 61, the processing circuit 62, and the memory 64 are not formed in one chip.

In addition, as illustrated in FIG. 5, the laminated imaging element in which the photoelectric conversion element 61 is laminated with the memory 64 is employed as the imaging element 44. Accordingly, a transfer speed of the captured image data 69 from the photoelectric conversion element 61 to the memory 64 can be increased, compared to a case of not laminating the photoelectric conversion element 61 and the memory 64. Improving the transfer speed contributes to high-speed processing in the entire processing circuit 62. In addition, the degree of design freedom can be increased, compared to a case of not laminating the photoelectric conversion element 61 and the memory 64. Furthermore, it is possible to contribute to size reduction of the imaging apparatus main body 12, compared to a case of not laminating the photoelectric conversion element 61 and the memory 64.

In addition, in the imaging apparatus 10, the live view image or the like based on the output image data 70 is displayed on the second display 86. Accordingly, the user can visually recognize an image indicated by the output image data 70. In addition, the power consumption can be reduced, compared to a case of displaying every captured image data 69B obtained by imaging the subject on the display. In addition, the user can visually recognize only an image that is expected to be highly necessary for the user.

Furthermore, in the imaging apparatus 10, the output image data 70 is stored in the secondary storage device 80 and/or the memory card or the like. Accordingly, a storage capacity of the secondary storage device 80 and/or the memory card can be prolonged, compared to a case of storing every captured image data 69B obtained by imaging the subject in the secondary storage device 80 or the like.

Figure 18:
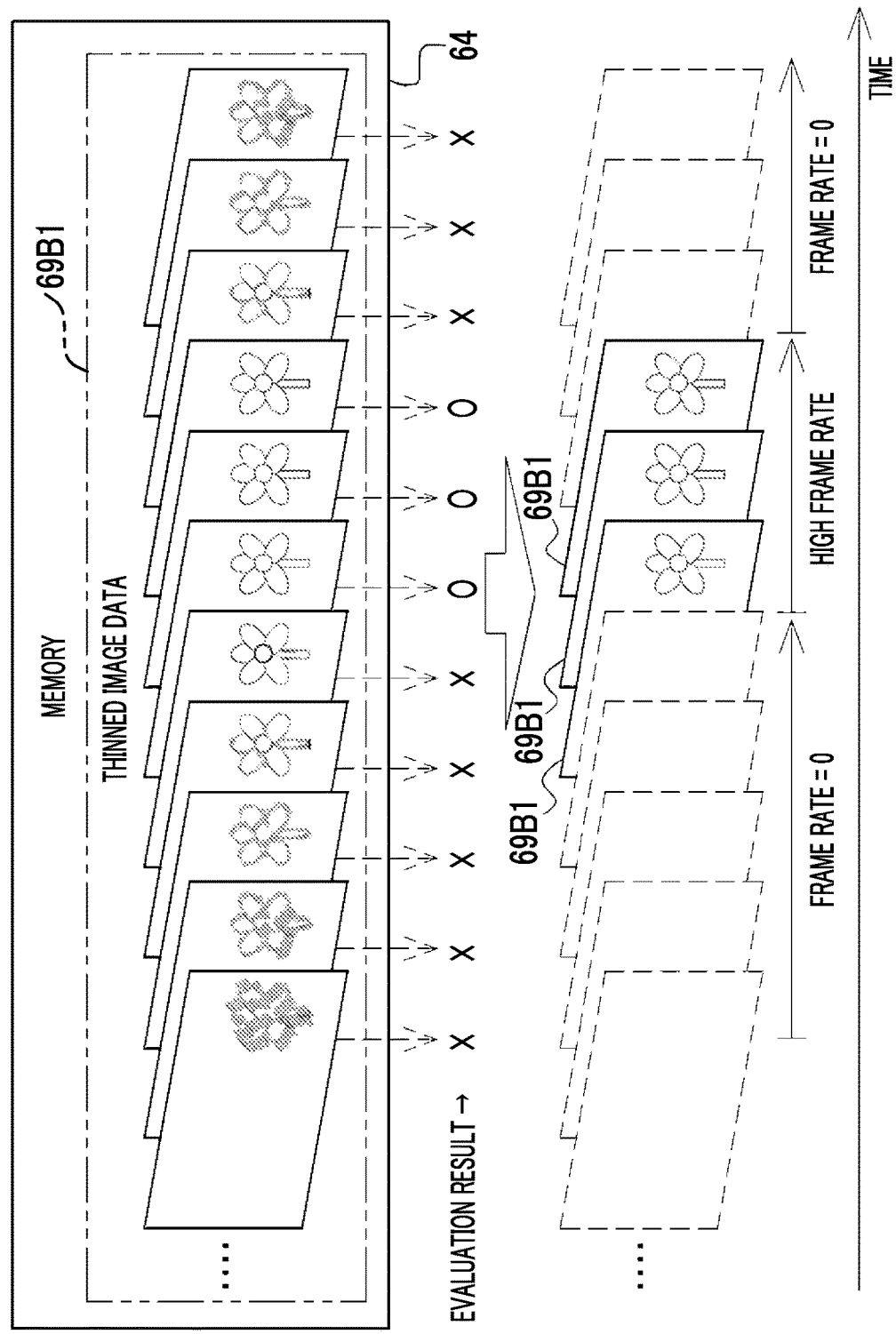
FIG. 18 is a conceptual diagram illustrating a modification example of the relationship among the thinned image data of the plurality of frames stored in time series in the memory by imaging the subject in the MF mode in the imaging apparatus according to the first embodiment, the evaluation result for each frame, and the output frame rate.

While the low frame rate and the high frame rate are set in the first embodiment, the technology of the present disclosure is not limited thereto. For example, as illustrated in FIG. 18, the thinned image data 69B1 may not be output to the controller 46 by the output circuit 62D by setting the frame rate to "0" instead of the low frame rate. That is, in a case where the focusing evaluation value is less than the threshold value TH1, the thinned image data 69B1 of the calculation target for the focusing evaluation value less than the threshold value TH1 is not output. Accordingly, the power consumption required for outputting the thinned image data 69B1 can be reduced, compared to a case of outputting the thinned image data 69B1 for which the focusing evaluation value is less than the threshold value.

While an example of a form of not outputting the thinned image data 69B1 is illustrated in the example illustrated in FIG. 18, the technology of the present disclosure is not limited thereto. For example, dummy data of which pixel values are "0" may be output during a period of the low frame rate. In this case, a toggle rate of data can be decreased, compared to a case of outputting the thinned image data 69B1 during the period of the low frame rate.

In addition, while an example of a form of assigning the low FR tag or the high FR tag to every thinned image data 69B1 is illustratively described in the first embodiment, the technology of the present disclosure is not limited thereto. For example, the FR tag may be assigned to only the thinned image data 69B1 at a timing of a change in evaluation result. Specifically, the high FR tag may be assigned to the thinned image data 69B1 at the timing of a change in evaluation result only in a case where the evaluation result changes from "x" to "○". In addition, in this case, the low FR tag may be assigned to the thinned image data 69B1 at the timing of a change in evaluation result only in a case where the evaluation result changes from "○" to "x".

In addition, while an example of a form in which the frame rate setting portion 62E1 specifies the timing of a change in evaluation result using the FR tag is illustratively described in the first embodiment, the technology of the present disclosure is not limited thereto. For example, the focusing evaluation value calculation portion 62C3 may output a signal indicating a change in evaluation result to the frame rate setting portion 62E1.

In this case, for example, the focusing evaluation value calculation portion 62C3 outputs a high evaluation result signal indicating the change in evaluation result from "x" to "○" to the control circuit 62E at the timing of the change in evaluation result from "x" to "○". In addition, the high evaluation result signal includes a high evaluation value frame number. The high evaluation value frame number refers to a number for specifying a frame of the thinned image data 69B1 at the timing of the change in evaluation result from "x" to "○".

In addition, the focusing evaluation value calculation portion 62C3 outputs a low evaluation result signal indicating the change in evaluation result from "○" to "x" to the control circuit 62E at the timing of the change in evaluation result from "○" to "x". In addition, the low evaluation result signal includes a low evaluation value frame number. The low evaluation value frame number refers to a number for specifying a frame of the thinned image data 69B1 at the timing of the change in evaluation result from "○" to "x".

In a case where the high evaluation result signal is input, the frame rate setting portion 62E1 sets the high frame rate as the output frame rate in a case where the thinned image data 69B1 of the frame specified by the frame number included in the high evaluation result signal is input. In addition, in a case where the low evaluation result signal is input, the frame rate setting portion 62E1 sets the low frame rate as the output frame rate in a case where the thinned image data 69B1 of the frame specified by the frame number included in the low evaluation result signal is input.

Second Embodiment

An example of a form of changing from the low frame rate to the high frame rate at the timing of the change in evaluation result from "x" to "○" is illustratively described in the first embodiment. An example of a form of advancing a timing of changing to the high frame rate will be described in a second embodiment. In the second embodiment, the same constituents as the first embodiment will be designated by the same reference signs and will not be described. Hereinafter, parts different from the first embodiment will be described.

Figure 19:
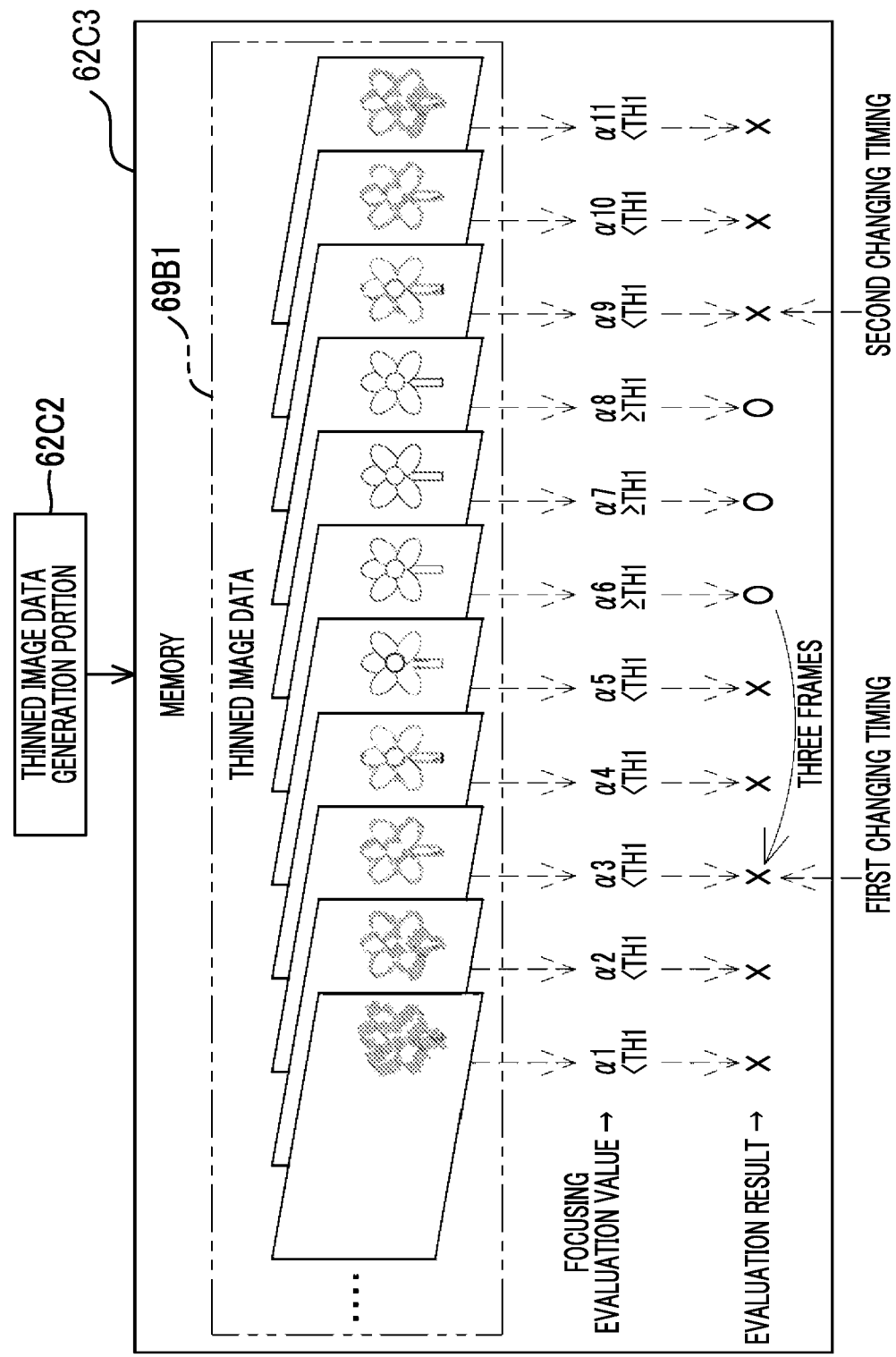
FIG. 19 is a conceptual diagram for describing a thinned image data generation portion and a focusing evaluation value calculation portion included in the imaging element of the imaging apparatus according to the second embodiment.

In the imaging element 44 of the imaging apparatus 10 according to the second embodiment, as illustrated in FIG. 19 as an example, the first changing timing is a timing advanced by three frames, compared to the first embodiment. In the example illustrated in FIG. 19, the first changing timing is set to be earlier by three frames than the timing of the change in evaluation result from "x" to "○".

Figure 20:
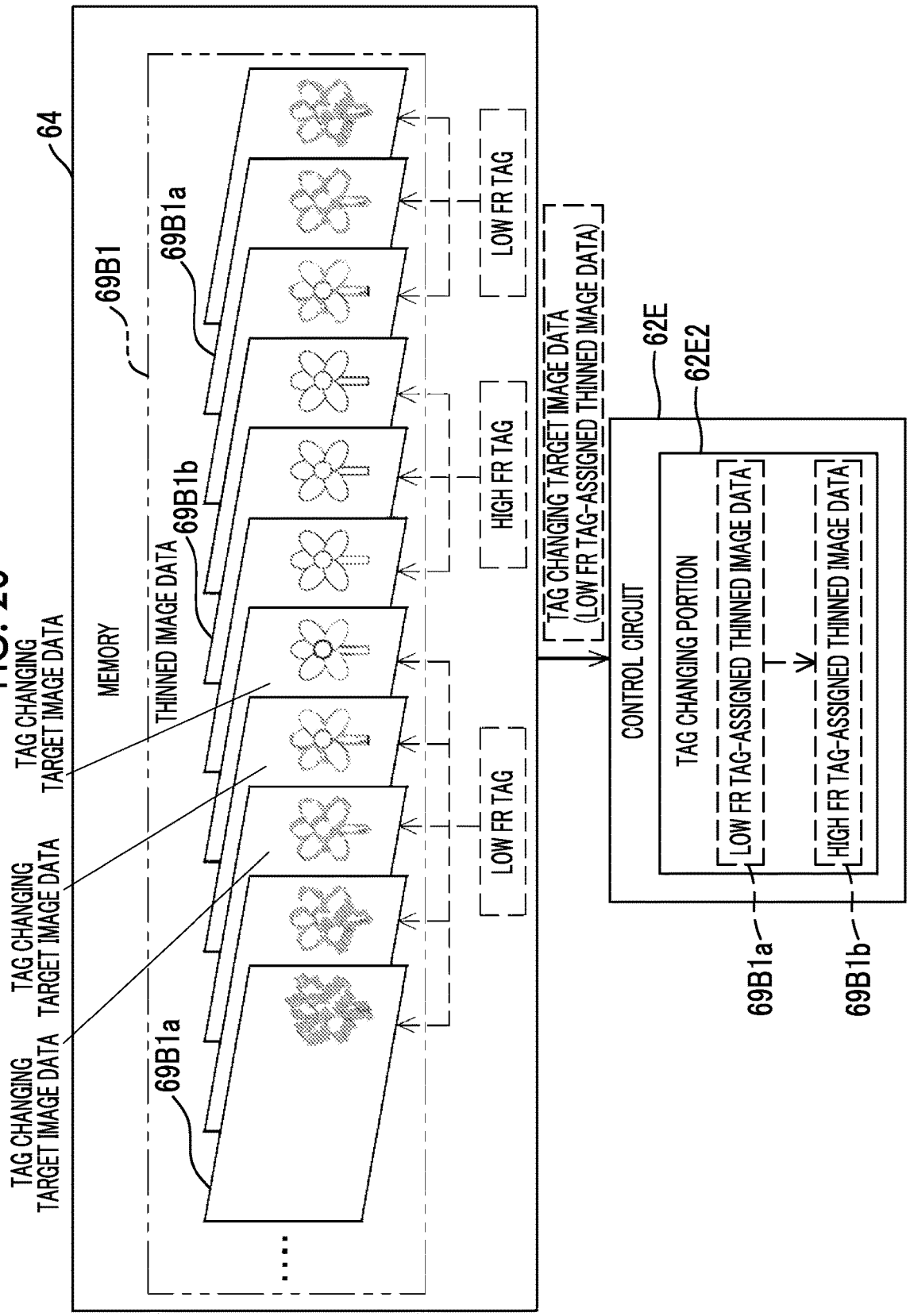
FIG. 20 is a conceptual diagram for describing a memory and a control circuit included in the imaging element of the imaging apparatus according to the second embodiment.

As illustrated in FIG. 20 as an example, the control circuit 62E includes a tag changing portion 62E2. The tag changing portion 62E2 changes a type of FR tag assigned to the tag-assigned thinned image data. In the second embodiment, the tag changing portion 62E2 changes specific low FR tag-assigned thinned image data 69B1a of tag changing target image data to the high FR tag-assigned thinned image data 69B1b by changing the low FR tag of the low FR tag-assigned thinned image data 69B1a to the high FR tag.

In the example illustrated in FIG. 20, the tag changing target image data is the low FR tag-assigned thinned image data 69B1a that is earlier than the focused state by three frames. That is, the tag changing target image data is the low FR tag-assigned thinned image data of three frames obtained during a period of three frames in a direction to the past from the high FR tag-assigned thinned image data 69B1b at the timing of the change in evaluation result from "x" to "○". The timing of the change in evaluation result from "x" to "○" refers to, in other words, a timing of a change from the low FR tag-assigned thinned image data 69B1a to the high FR tag-assigned thinned image data 69B1b.

The "three frames" here are an example of a "first number of frames" and a "third number of frames" according to the embodiments of the technology of the present disclosure. While the "three frames" are illustrated in the second embodiment, the technology of the present disclosure is not limited thereto. The number of frames may be greater than or equal to one frame. The number of frames determining the tag changing target image data may be a fixed value or a variable value that can be changed in accordance with an instruction received by the reception portion 84 (refer to FIG. 3).

Figure 21:
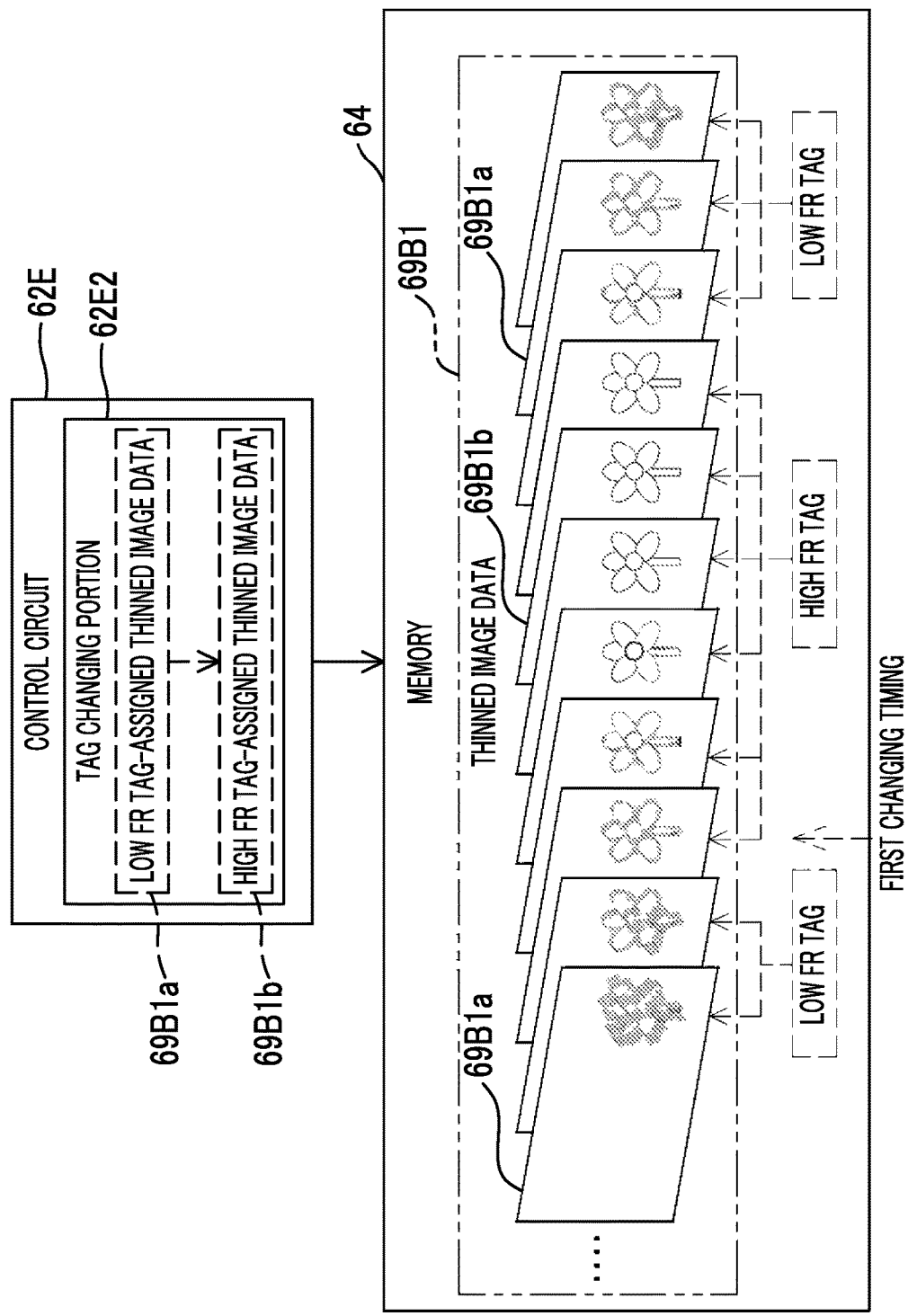
FIG. 21 is a conceptual diagram for describing the control circuit and the memory included in the imaging element of the imaging apparatus according to the second embodiment.

The tag changing portion 62E2 acquires the low FR tag-assigned thinned image data 69B1a of three frames earlier than the focused state as the tag changing target image data. The tag changing portion 62E2 changes the low FR tag-assigned thinned image data 69B1a to the high FR tag-assigned thinned image data 69B1b by changing the low FR tag of the acquired low FR tag-assigned thinned image data 69B1a to the high FR tag. As illustrated in FIG. 21 as an example, the tag changing portion 62E2 returns the high FR tag-assigned thinned image data 69B1b obtained by changing the FR tag to the memory 64. That is, the low FR tag-assigned thinned image data 69B1a of a target for changing the FR tag is replaced with the high FR tag-assigned thinned image data 69B1b after changing the FR tag.

Accordingly, as illustrated in FIG. 21, compared to a state illustrated in FIG. 20, the high FR tag-assigned thinned image data 69B1b stored in the memory 64 is increased by three frames in a direction to the past, compared to the high FR tag-assigned thinned image data 69B1b in the focused state.

Figure 22:
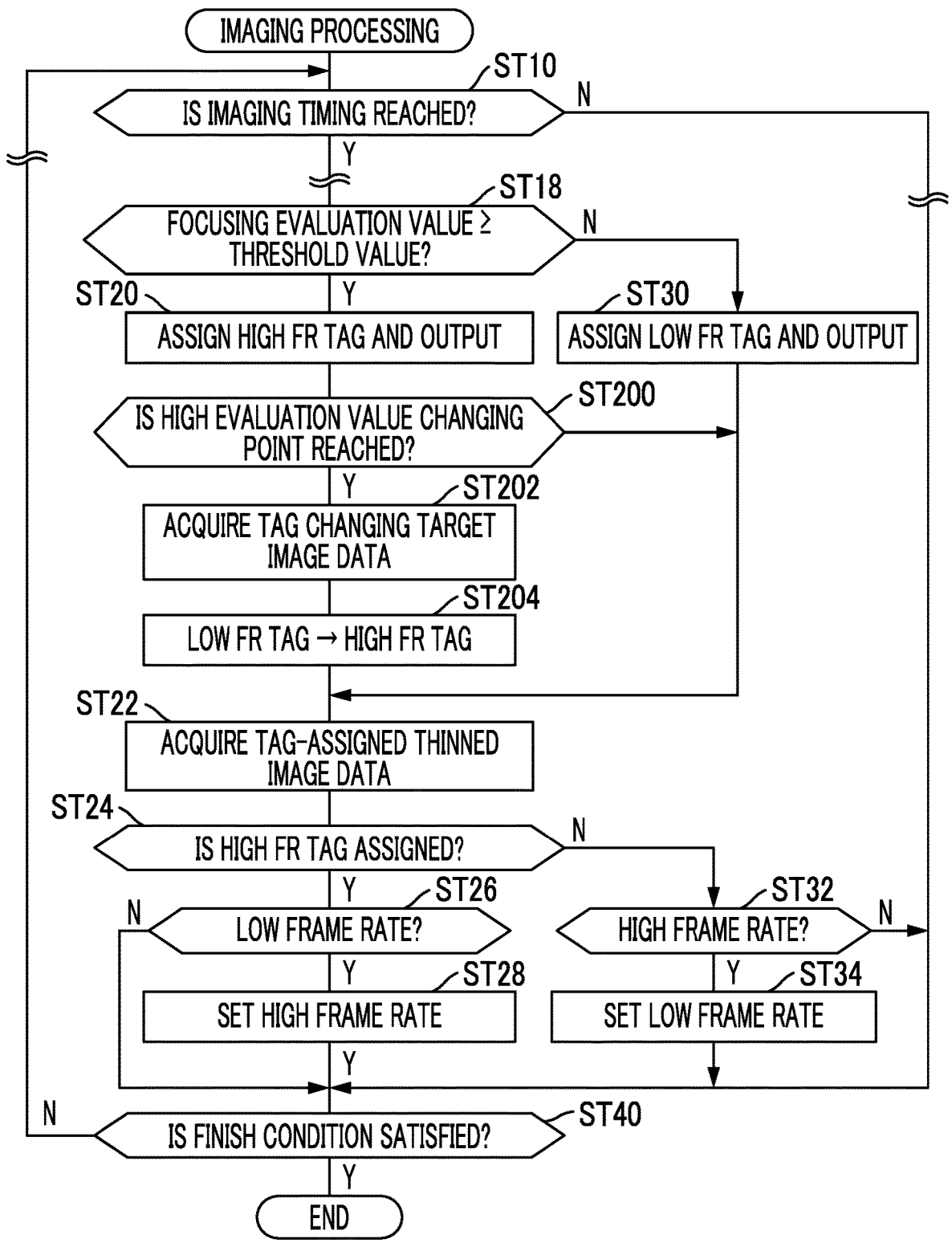
FIG. 22 is a flowchart illustrating an example of a flow of imaging processing according to the second embodiment.

Next, an action of the imaging apparatus 10 according to the second embodiment will be described with reference to FIG. 22. FIG. 22 illustrates an example of a flow of imaging processing executed by the processing circuit 62 of the imaging element 44 according to the second embodiment. The imaging processing illustrated in FIG. 22 is different from the imaging processing illustrated in FIG. 17 in that step ST200 to step ST204 are included. Thus, in a flowchart of the imaging processing illustrated in FIG. 22, the same steps as the imaging processing illustrated in FIG. 17 are designated by the same step numbers. Hereinafter, only parts of the imaging processing illustrated in FIG. 22 different from the imaging processing illustrated in FIG. 17 will be described.

In the imaging processing illustrated in FIG. 22, after processing of step ST20 is executed, the imaging processing transitions to step ST200. In step ST200, the control circuit 62E determines whether or not a high evaluation value changing point is currently reached. The high evaluation value changing point refers to a timing at which the tag-assigned thinned image data input from the focusing evaluation value calculation portion 62C3 is changed to the high FR tag-assigned thinned image data 69B1b from the low FR tag-assigned thinned image data 69B1a. Whether or not the high evaluation value changing point is reached is determined by comparing the most recent tag-assigned thinned image data stored in the memory 64 by the control circuit 62E with the most recent tag-assigned thinned image data input from the focusing evaluation value calculation portion 62C3. That is, in a case where the most recent tag-assigned thinned image data stored in the memory 64 is the low FR tag-assigned thinned image data 69B1a, and the most recent tag-assigned thinned image data input into the control circuit 62E from the focusing evaluation value calculation portion 62C3 is the high FR tag-assigned thinned image data 69B1b, it is determined that the high evaluation value changing point is reached.

In step ST200, in a case where the high evaluation value changing point is currently reached, a positive determination is made, and the imaging processing transitions to step ST202. In step ST200, in a case where the high evaluation value changing point is currently not reached, a negative determination is made, and the imaging processing transitions to step ST22.

In step ST202, as described above, the tag changing portion 62E2 acquires the low FR tag-assigned thinned image data 69B1a of three frames earlier than the focused state as the tag changing target image data from the memory 64. Then, the imaging processing transitions to step ST204.

In step ST204, the tag changing portion 62E2 generates the high FR tag-assigned thinned image data 69B1b by changing the low FR tag of the low FR tag-assigned thinned image data 69B1a of three frames earlier than the focused state acquired in step ST202 to the high FR tag. In the memory 64, the tag changing portion 62E2 replaces the low FR tag-assigned thinned image data 69B1a of the target for changing the FR tag with the high FR tag-assigned thinned image data 69B1b after changing the FR tag. After processing of step ST204 is executed, the imaging processing transitions to step ST22.

Accordingly, as illustrated in FIG. 19 as an example, the first changing timing is advanced by three frames, compared to a case of the first changing timing in the first embodiment. Accordingly, by executing processing of step ST24 to step ST28, the non-focusing image data of three frames earlier than the focused state is output, and the focusing image data is output subsequently to the output of the non-focusing image data. Thus, the user can visually recognize an aspect of transitioning from the non-focused state to the focused state through the image.

Third Embodiment

An example of a form of changing from the high frame rate to the low frame rate at the timing of the change in evaluation result from "○" to "x" is illustratively described in the first embodiment. An example of a form of delaying a timing of changing to the low frame rate will be described in a third embodiment. In the third embodiment, the same constituents as the first and second embodiments will be designated by the same reference signs and will not be described. Hereinafter, parts different from the first and second embodiments will be described.

Figure 23:
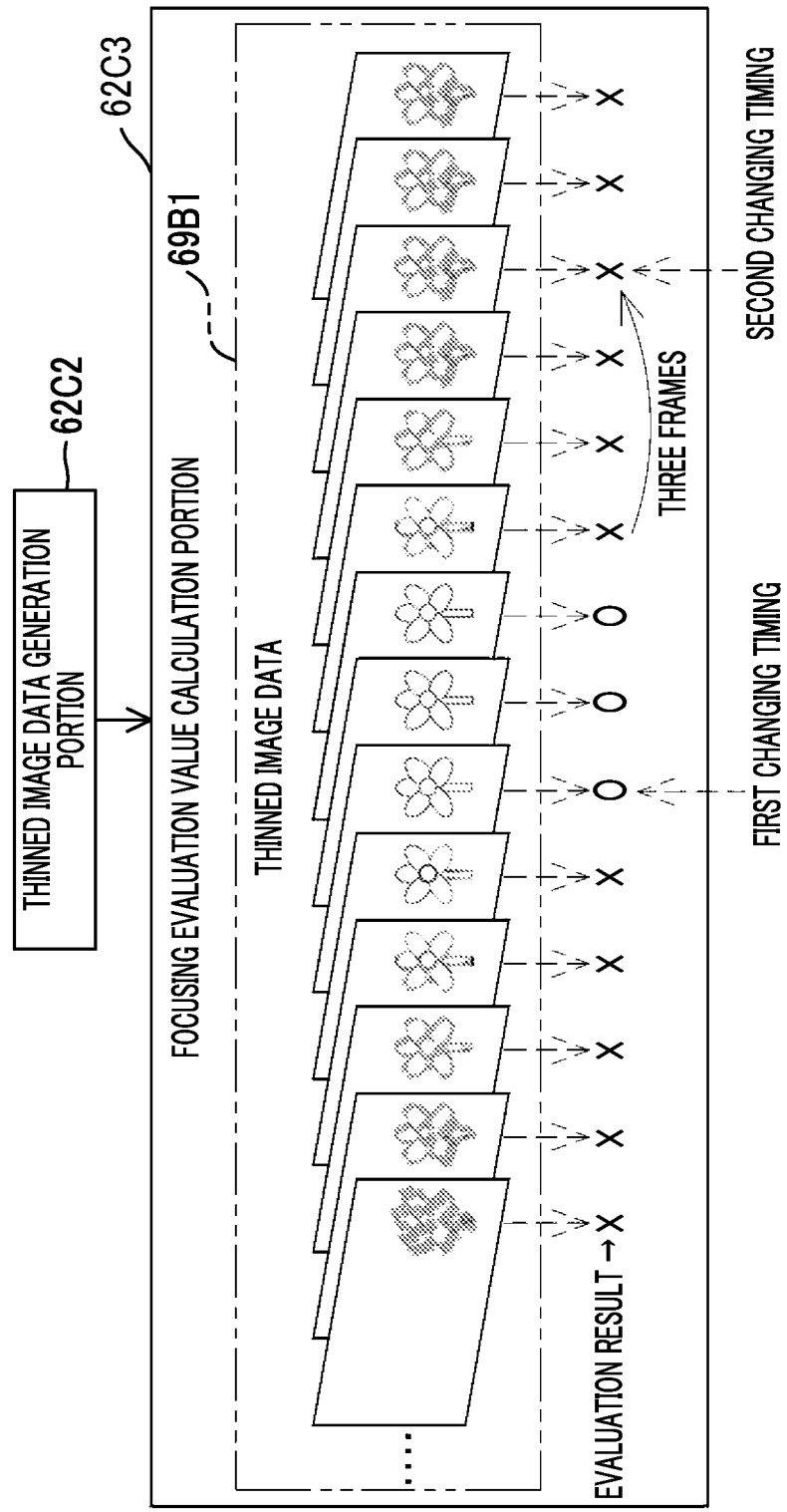
FIG. 23 is a conceptual diagram for describing a thinned image data generation portion and a focusing evaluation value calculation portion included in the imaging element of the imaging apparatus according to the third embodiment.

In the imaging element 44 of the imaging apparatus 10 according to the third embodiment, as illustrated in FIG. 23 as an example, the second changing timing is a timing delayed by three frames, compared to the first embodiment. The "three frames" here are an example of a second number of frames" and a "fourth number of frames" according to the embodiments of the technology of the present disclosure. While the "three frames" are illustrated in the third embodiment, the technology of the present disclosure is not limited thereto. The number of frames may be greater than or equal to one frame. The number of frames determining the tag changing target image data may be a fixed value or a variable value that can be changed in accordance with an instruction received by the reception portion 84 (refer to FIG. 3).

In the example illustrated in FIG. 23, the second changing timing is set to be later by three frames than the timing of the change in evaluation result from "○" to "x". In other words, the second changing timing is set to be later by four frames than a time of "○" at which the evaluation result is changed from "○" to "x".

Figure 24:
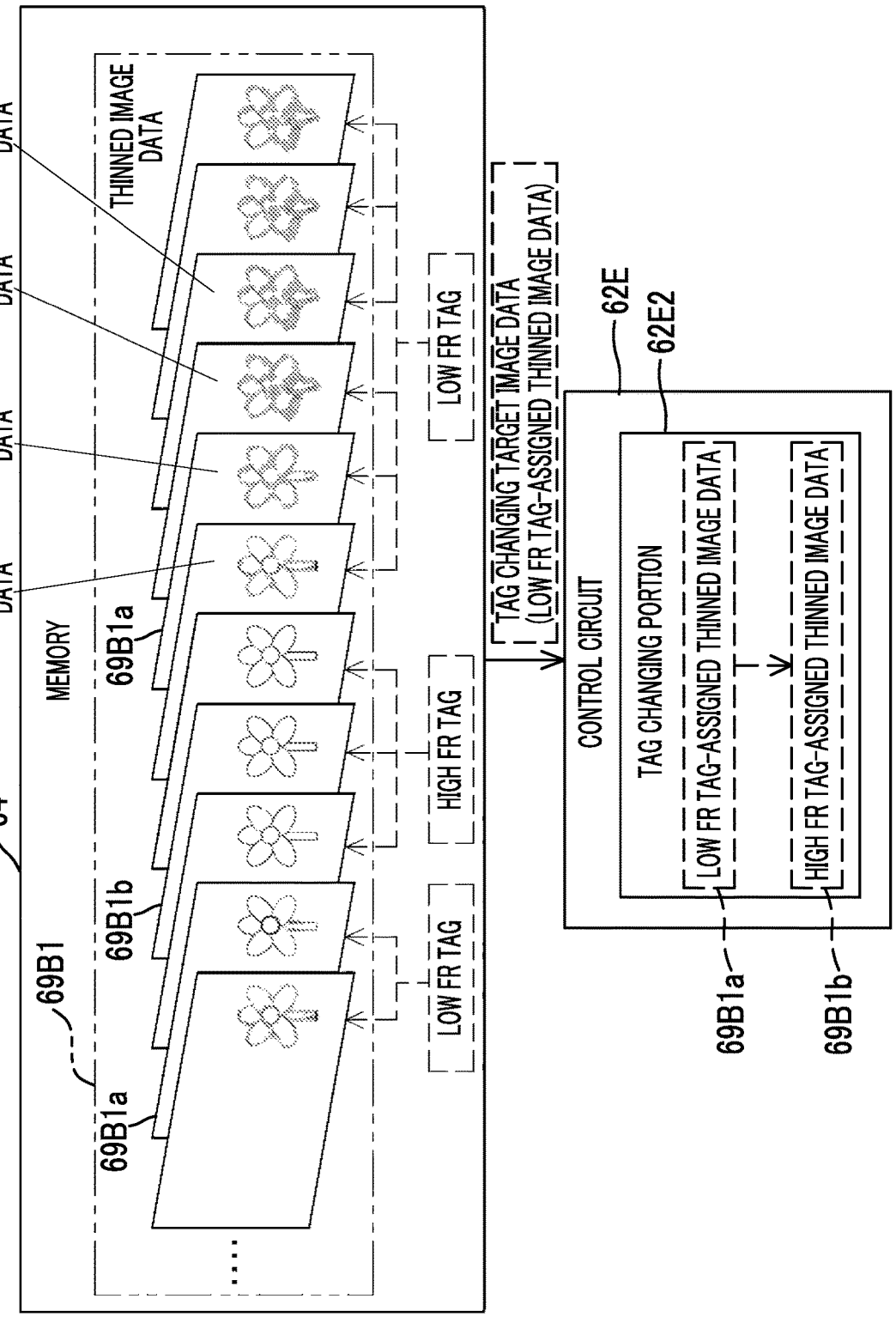
FIG. 24 is a conceptual diagram for describing a memory and a control circuit included in the imaging element of the imaging apparatus according to the third embodiment.

As illustrated in FIG. 24 as an example, the tag changing target image data is the low FR tag-assigned thinned image data 69B1a of three frames from a time of a change from the focused state to the non-focused state. In other words, the tag changing target image data is the low FR tag-assigned thinned image data 69B1a of four frames obtained during a period delayed by four frames including the low FR tag-assigned thinned image data 69B1a at the timing of the change in evaluation result from "○" to "x". The timing of the change in evaluation result from "○" to "x" refers to, in other words, a timing of a change from the high frame tag-assigned thinned image data 69B1b to the low FR tag-assigned thinned image data 69B1a.

Figure 25:
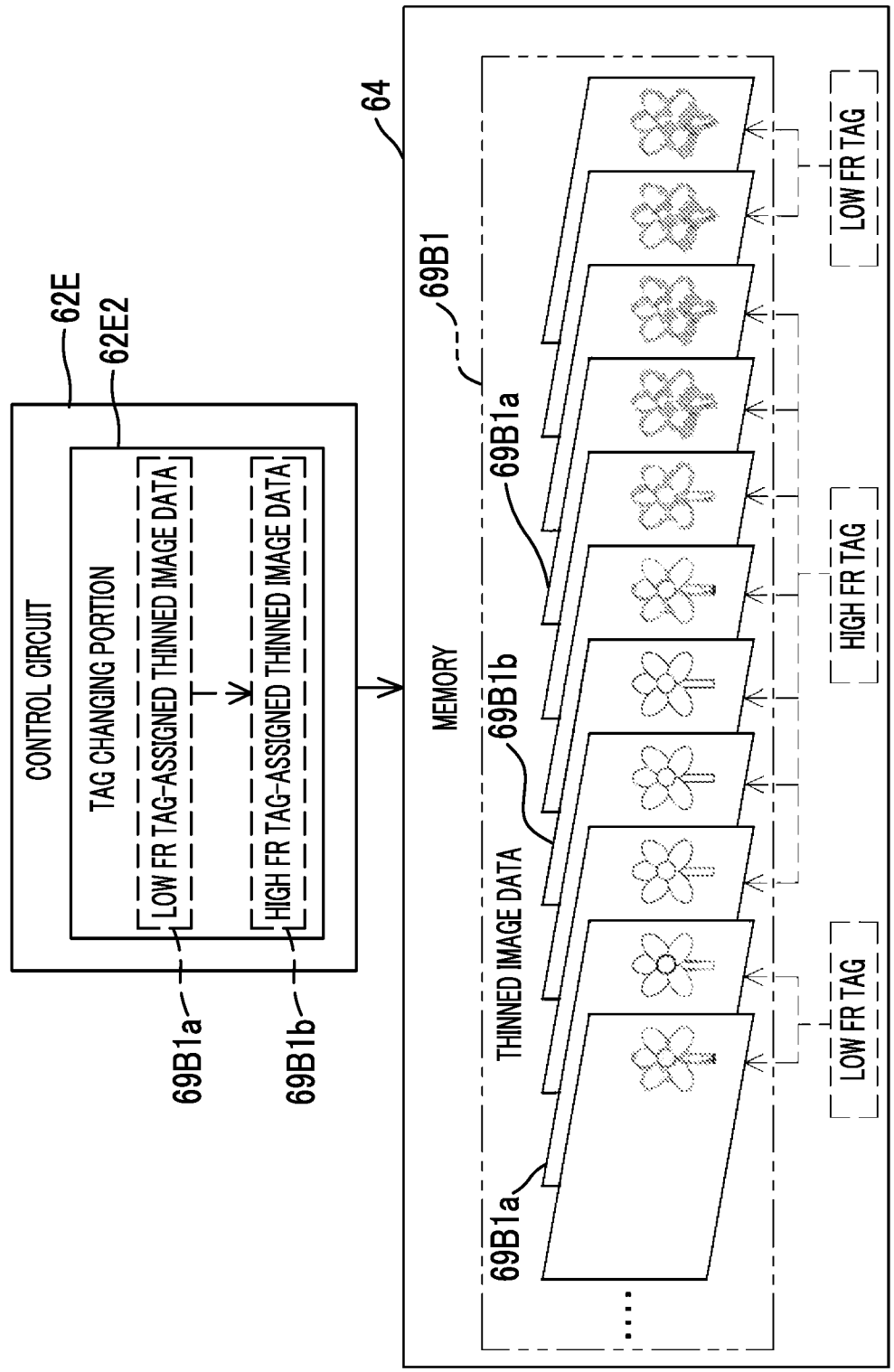
FIG. 25 is a conceptual diagram for describing the control circuit and the memory included in the imaging element of the imaging apparatus according to the third embodiment.

The tag changing portion 62E2 acquires the low FR tag-assigned thinned image data 69B1a of four frames after changing from the focused state to the non-focused state, as the tag changing target image data. The tag changing portion 62E2 changes the low FR tag-assigned thinned image data 69B1a to the high FR tag-assigned thinned image data 69B1b by changing the low FR tag of the acquired low FR tag-assigned thinned image data 69B1a to the high FR tag. As illustrated in FIG. 25 as an example, the tag changing portion 62E2 returns the high FR tag-assigned thinned image data 69B1b obtained by changing the FR tag to the memory 64. That is, the low FR tag-assigned thinned image data 69B1a of the target for changing the FR tag is replaced with the high FR tag-assigned thinned image data 69B1b after changing the FR tag.

Accordingly, as illustrated in FIG. 25, compared to a state illustrated in FIG. 20, the high FR tag-assigned thinned image data 69B1b stored in the memory 64 is increased by four frames of a period delayed from the high FR tag-assigned thinned image data 69B1b in the focusing state in a direction to the past, compared to the high FR tag-assigned thinned image data 69B1b in the focused state.

Figure 26:
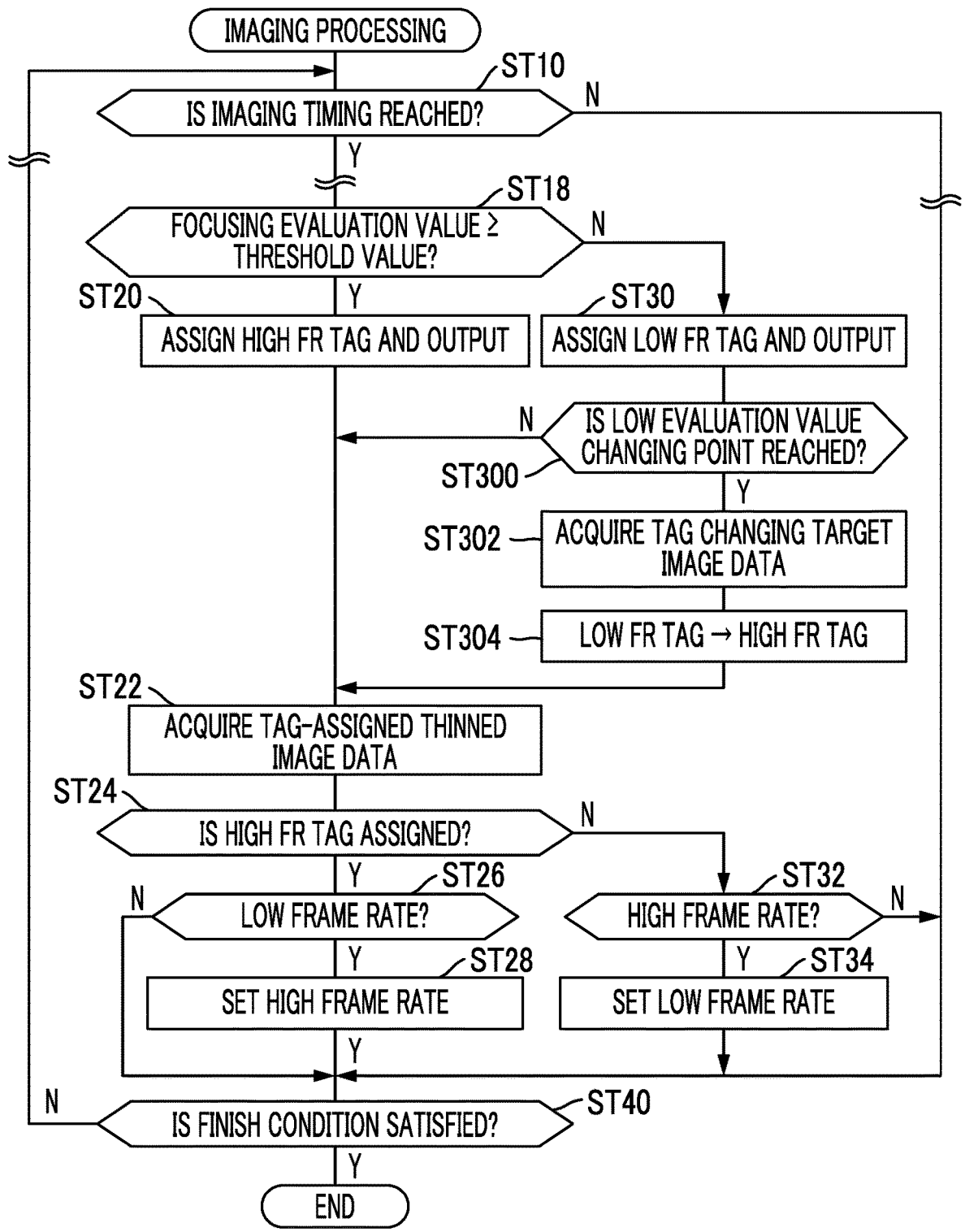
FIG. 26 is a flowchart illustrating an example of a flow of imaging processing according to the third embodiment.

Next, an action of the imaging apparatus 10 according to the third embodiment will be described with reference to FIG. 26. FIG. 26 illustrates an example of a flow of imaging processing executed by the processing circuit 62 of the imaging element 44 according to the third embodiment. The imaging processing illustrated in FIG. 26 is different from the imaging processing illustrated in FIG. 17 in that step ST300 to step ST304 are included. Thus, in a flowchart of the imaging processing illustrated in FIG. 26, the same steps as the imaging processing illustrated in FIG. 17 are designated by the same step numbers. Hereinafter, only parts of the imaging processing illustrated in FIG. 26 different from the imaging processing illustrated in FIG. 17 will be described.

In the imaging processing illustrated in FIG. 26, after processing of step ST30 is executed, the imaging processing transitions to step ST300. In step ST300, the control circuit 62E determines whether or not a low evaluation value changing point is currently reached. The low evaluation value changing point refers to a timing at which the tag-assigned thinned image data input from the focusing evaluation value calculation portion 62C3 is changed to the low FR tag-assigned thinned image data 69B1a from the high FR tag-assigned thinned image data 69B1b. Whether or not the low evaluation value changing point is reached is determined by comparing the most recent tag-assigned thinned image data stored in the memory 64 by the control circuit 62E with the most recent tag-assigned thinned image data input from the focusing evaluation value calculation portion 62C3. That is, in a case where the most recent tag-assigned thinned image data stored in the memory 64 is the high FR tag-assigned thinned image data 69B1$b$, and the most recent tag-assigned thinned image data input into the control circuit 62E from the focusing evaluation value calculation portion 62C3 is the low FR tag-assigned thinned image data 69B1$a$, it is determined that the low evaluation value changing point is reached.

In step ST300, in a case where the low evaluation value changing point is currently reached, a positive determination is made, and the imaging processing transitions to step ST302. In step ST300, in a case where the low evaluation value changing point is currently not reached, a negative determination is made, and the imaging processing transitions to step ST22.

In step ST302, as described above, the tag changing portion 62E2 acquires the low FR tag-assigned thinned image data 69B1$a$ of four frames as the tag changing target image data from the memory 64. Then, the imaging processing transitions to step ST304. The "low FR tag-assigned thinned image data 69B1$a$ of four frames" here refers to the low FR tag-assigned thinned image data 69B1$a$ of four frames obtained during the period delayed by four frames including the low FR tag-assigned thinned image data 69B1$a$ at the timing of the change in evaluation result from "○" to "x".

In step ST304, the tag changing portion 62E2 generates the high FR tag-assigned thinned image data 69B1$b$ by changing the low FR tag of the low FR tag-assigned thinned image data 69B1$a$ of four frames acquired in step ST302 to the high FR tag. In the memory 64, the tag changing portion 62E2 replaces the low FR tag-assigned thinned image data 69B1$a$ of the target for changing the FR tag with the high FR tag-assigned thinned image data 69B1$b$ after changing the FR tag. After processing of step ST304 is executed, the imaging processing transitions to step ST22.

Accordingly, as illustrated in FIG. 23 as an example, the second changing timing is delayed by three frames, compared to a case of the second changing timing in the first embodiment. Delaying the second changing timing by three frames means that the high FR tag-assigned thinned image data 69B1$b$ is increased by four frames (refer to FIG. 23 to FIG. 25). Accordingly, by executing processing of step ST24 to step ST28, the high FR tag-assigned thinned image data 69B1$b$ of four frames is output subsequently to the output of the focusing image data, and then, the non-focusing image data is output. Thus, the user can visually recognize an aspect of transitioning from the focused state to the non-focused state through the image.

Figure 27:
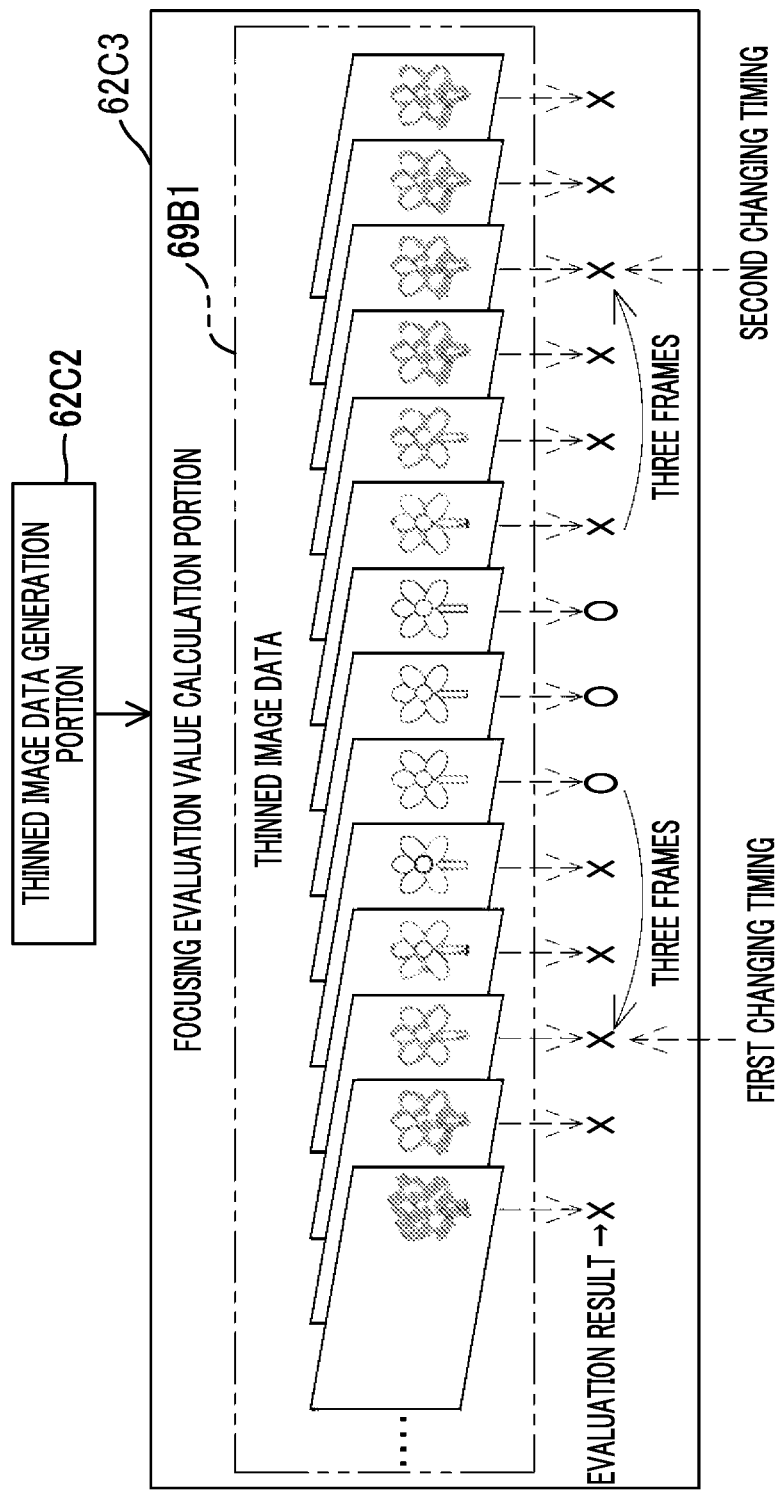
FIG. 27 is a conceptual diagram for describing a thinned image data generation portion and a focusing evaluation value calculation portion included in an imaging element of an imaging apparatus according to a modification example of the third embodiment.

While an example of a form of delaying the timing of changing to the low frame rate is illustratively described in the third embodiment, the technology of the present disclosure is not limited thereto. For example, as illustrated in FIG. 27, not only the timing of changing to the low frame rate may be delayed, but also the timing of changing to the high frame rate may be advanced in the same manner as the second embodiment. That is, the first changing timing is a timing advanced from the first embodiment, and the second changing timing is a timing delayed from the first embodiment. In the example illustrated in FIG. 27, the first changing timing is set to be advanced by three frames from the first embodiment, and the second changing timing is set to be delayed by three frames from the first embodiment.

Figure 28:
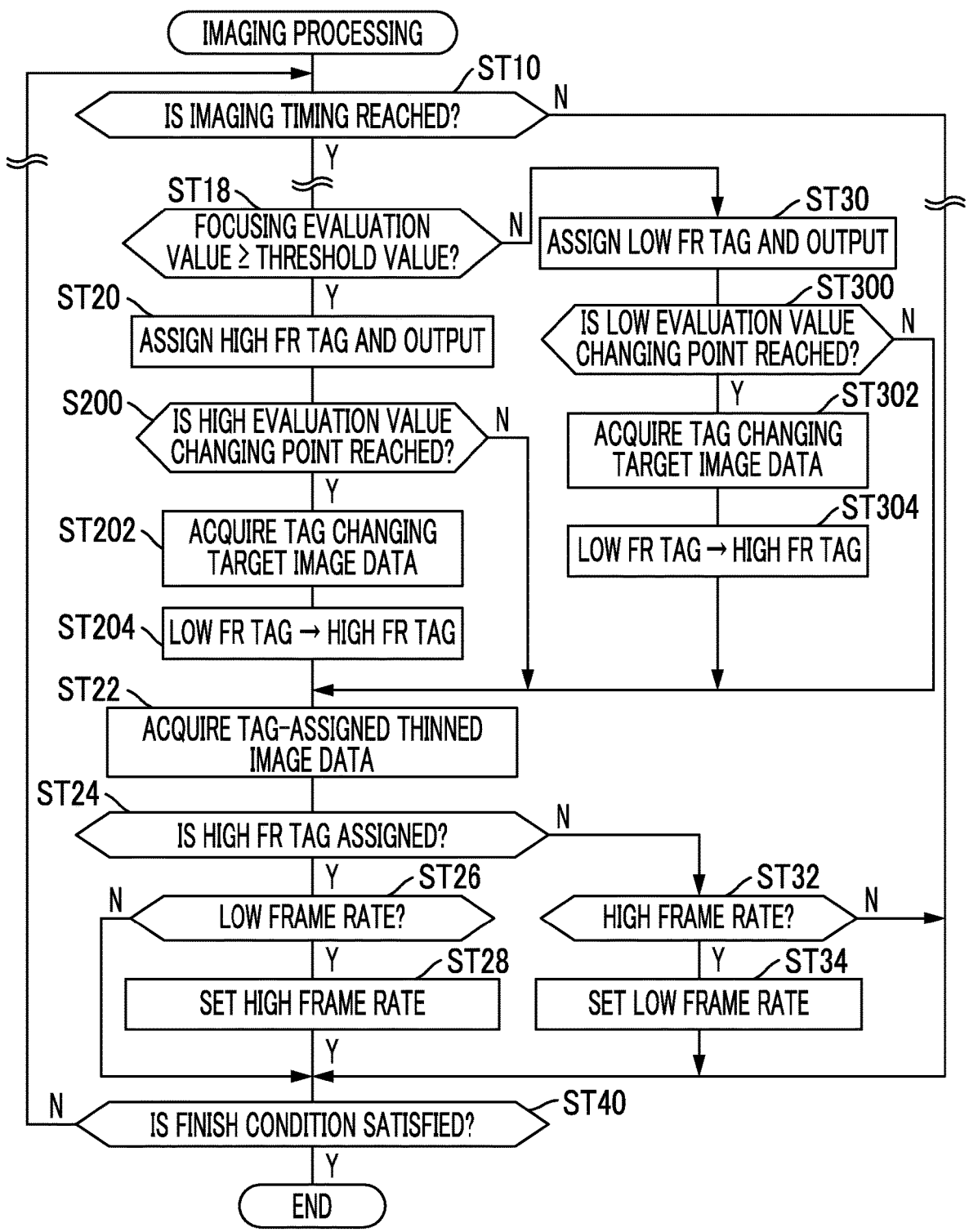
FIG. 28 is a flowchart illustrating an example of a flow of imaging processing according to the modification example of the third embodiment.

In a case of setting the first changing timing and the second changing timing in such a manner, as illustrated in FIG. 28, processing of steps ST200 to ST204 and processing of steps ST300 to ST304 are added to the imaging processing according to the first embodiment. That is, steps ST200 to ST204 may be added between step ST18 and step ST22 of the imaging processing of the first embodiment, and steps ST300 to ST304 may be added between step ST30 and step ST22. In this case, two effects including an effect described in the second embodiment and an effect described in the third embodiment can be obtained.

Fourth Embodiment

An example of a form of applying the contrast value as the focusing evaluation value is illustratively described in each of the embodiments. An example of a form of applying a phase difference and a phase difference evaluation value as the focusing evaluation value will be described in a fourth embodiment. In the fourth embodiment, the same constituents as each of the embodiments will be designated by the same reference signs and will not be described. Hereinafter, parts different from each of the embodiments will be described.

Figure 29:
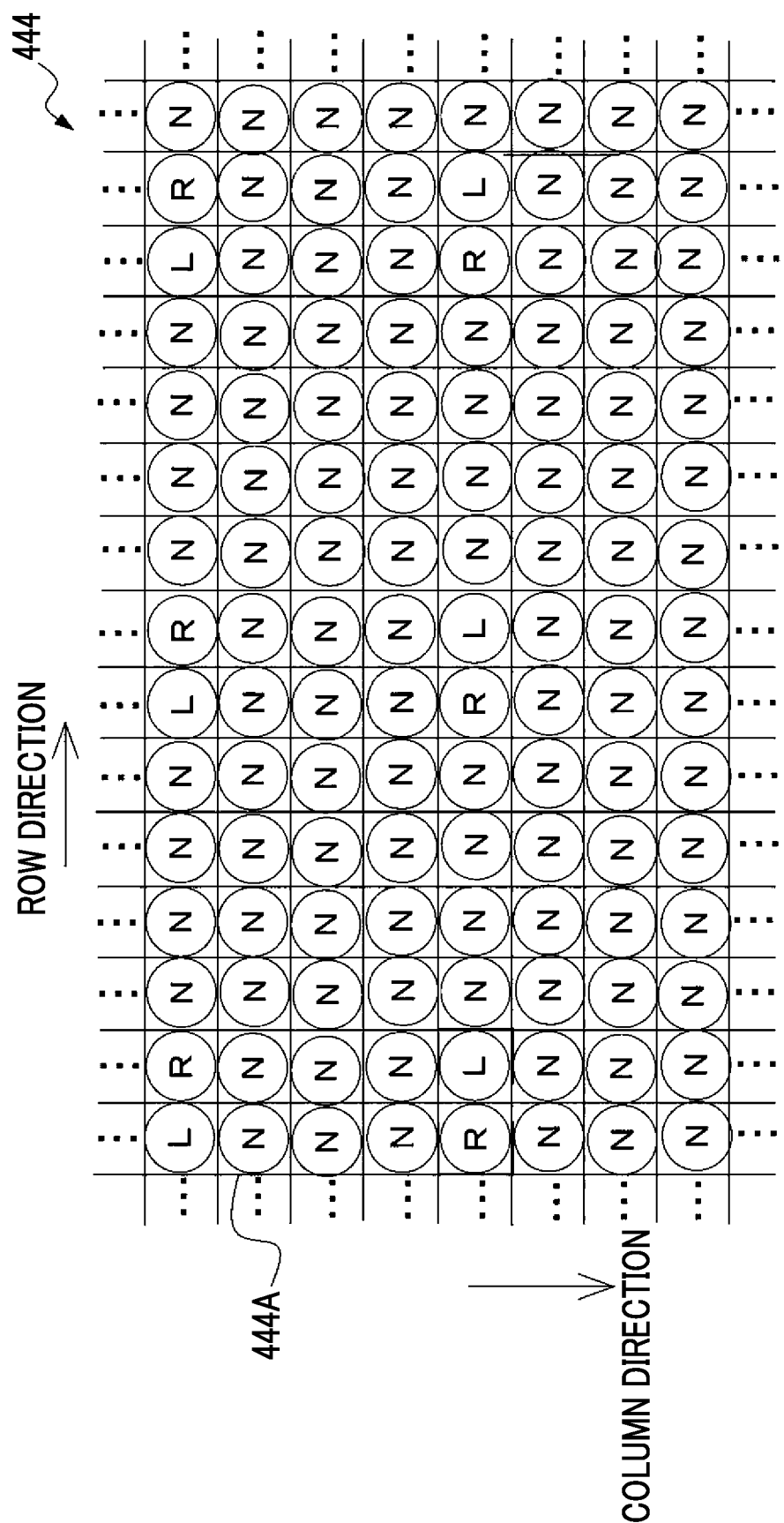
FIG. 29 is a conceptual diagram illustrating an example of a structure of the imaging element included in the imaging apparatus according to the fourth embodiment.

The imaging apparatus 10 according to the fourth embodiment is different from each of the embodiments in that an imaging element 444 is included instead of the imaging element 44. As illustrated in FIG. 29 as an example, the imaging element 444 is different from the imaging element 44 in that a photoelectric conversion element 444A is included instead of the photoelectric conversion element 61. The photoelectric conversion element 444A includes first pixels L, second pixels R, and normal pixels N. The normal pixels N are pixels that are the same as the pixels included in the photoelectric conversion element 61 described in the first embodiment and do not include light blocking members 21L and 21R (refer to FIG. 30) described later. In the photoelectric conversion element 444A, the first pixels L and the second pixels are periodically arranged at intervals of a plurality of columns with a plurality of the normal pixels N interposed therebetween in the row direction.

Figure 30:
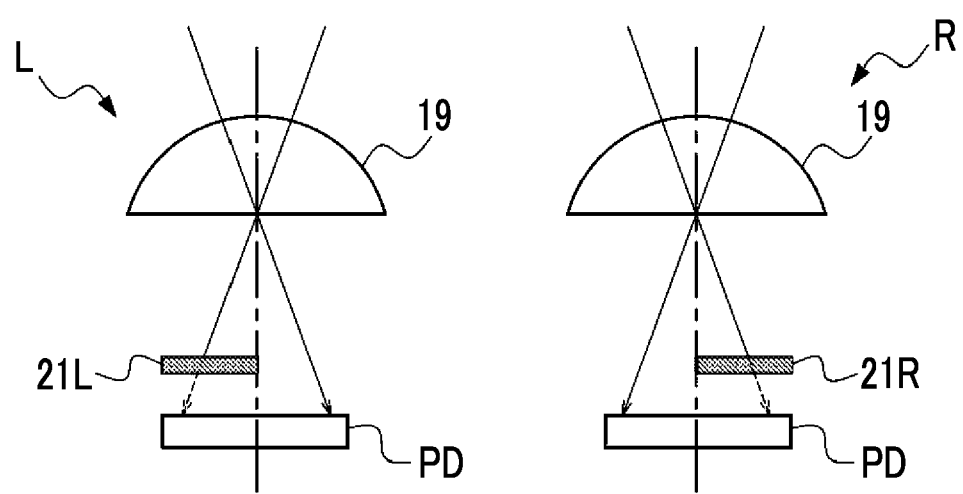
FIG. 30 is a schematic configuration diagram illustrating an example of a structure of an image plane phase difference pixel included in the imaging element according to the fourth embodiment.

As illustrated in FIG. 30 as an example, each of the first pixels L and each of the second pixels R include a microlens 19 and a photodiode PD. The first pixel L includes the light blocking member 21L, and the second pixel R includes the light blocking member 21R.

The first pixel L is a pixel in which a left half (a left side in a case of facing the subject from a light receiving surface (in other words, a right side in a case of facing the light receiving surface from the subject)) of a light receiving surface of the photodiode PD in the row direction (refer to FIG. 29) is blocked from light by the light blocking member 21L. The second pixel R is a pixel in which a right half (a right side in a case of facing the subject from the light receiving surface (in other words, a right side in a case of facing the light receiving surface from the subject)) of the light receiving surface of the photodiode PD in the row direction (refer to FIG. 29) is blocked from light by the light blocking member 21R.

The microlens 19 and the light blocking members 21L and 21R function as a pupil separation portion. That is, a luminous flux passing through an exit pupil of the imaging lens 40 is divided leftward and rightward by the microlens 19 and the light blocking members 21L and 21R. The first pixel L receives left region passing light, and the second pixel R receives right region passing light. Consequently, a subject image corresponding to the left region passing light and a subject image corresponding to the right region passing light are obtained as parallax images having a difference in parallax.

The first pixel L and the second pixel R configured in such a manner are an example of an "image plane phase difference pixel" according to the embodiments of the technology of the present disclosure. Hereinafter, for convenience of description, the first pixel L and the second pixel R will be referred to as the "image plane phase difference pixel" unless otherwise necessary to distinguish therebetween.

Figure 31:
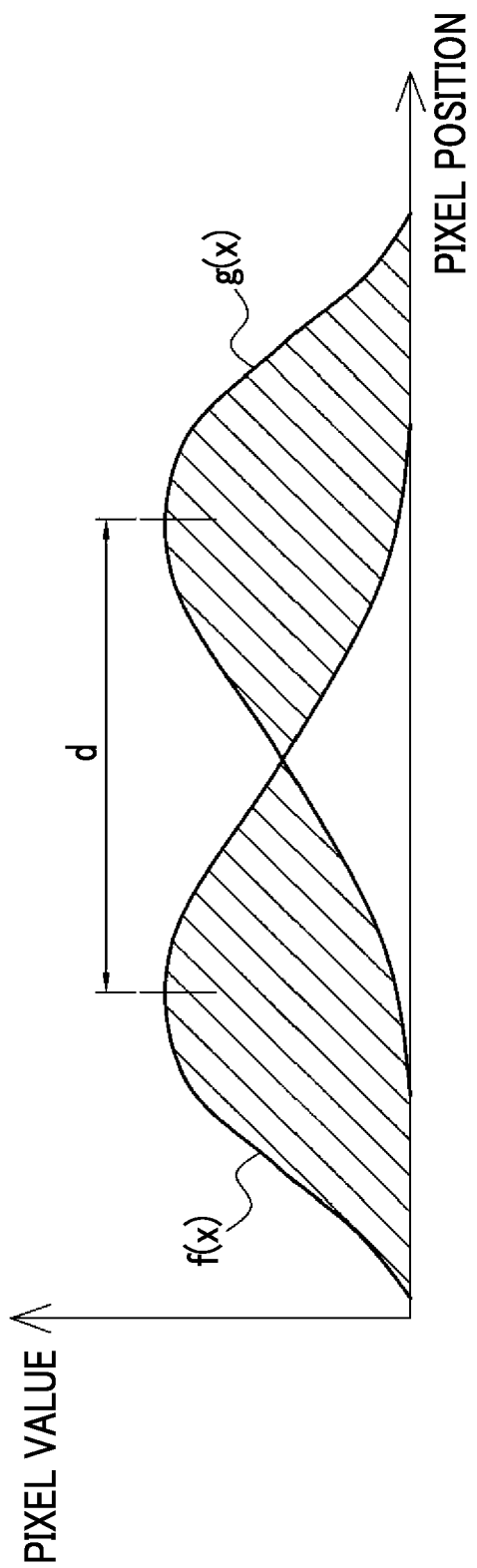
FIG. 31 is a graph illustrating a relationship of a function indicating a distribution of each pixel value based on each of a first pixel and a second pixel included in the imaging element according to the fourth embodiment.
Figure 32:
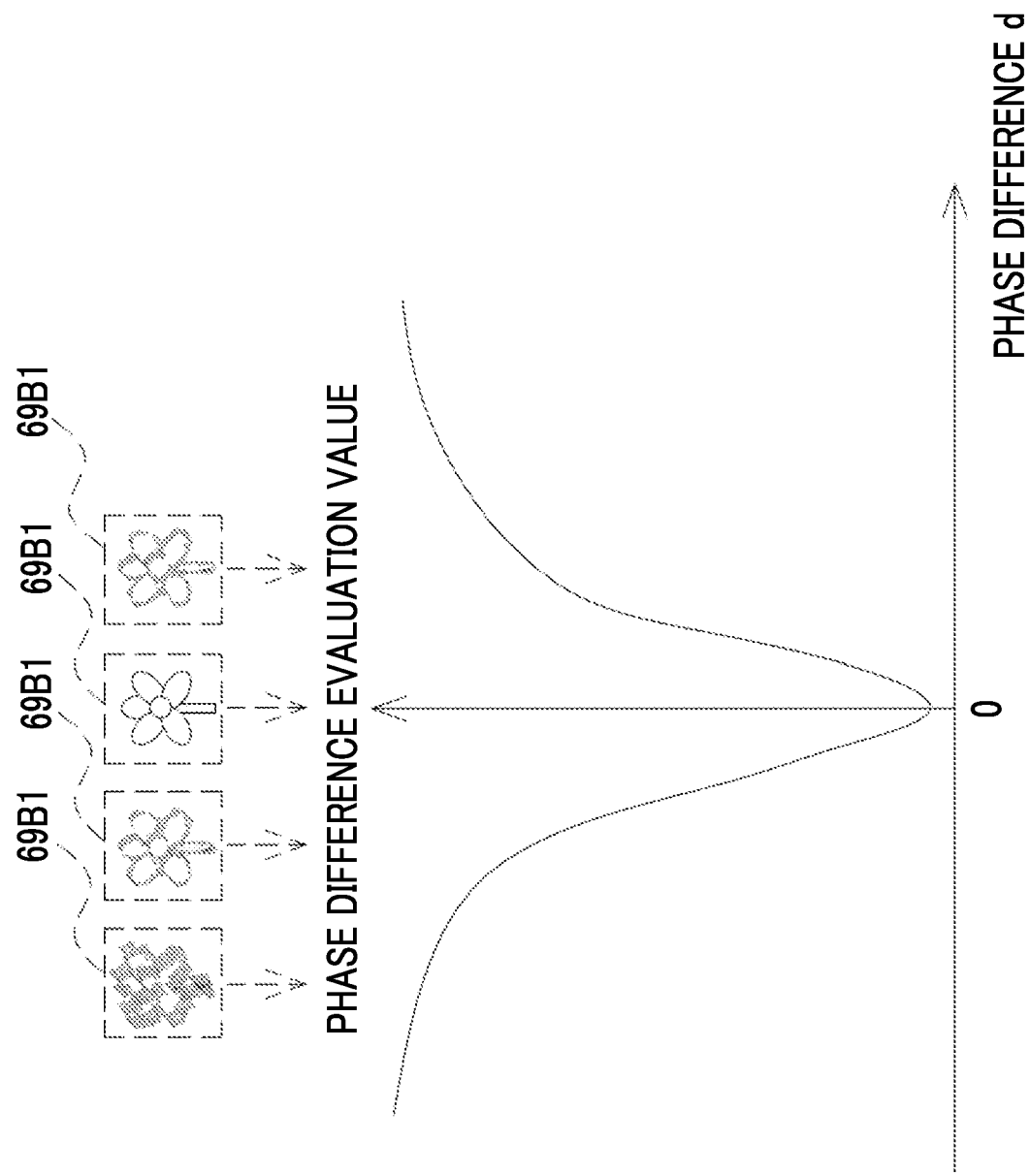
FIG. 32 is a graph illustrating an example of a relationship between a phase difference evaluation value and a phase difference obtained from the graph illustrated in FIG. 31.

As illustrated in FIG. 31 as an example, a light receiving result of the image plane phase difference pixel for one row including the image plane phase difference pixel among all pixels included in the photoelectric conversion element 444A is represented by a function f(x) and a function g(x). The function f(x) is a function indicating a distribution of a pixel value of the first pixel L, and the function g(x) is a function indicating a distribution of a pixel value of the second pixel R.

The focusing evaluation value calculation portion 62C3 (refer to FIG. 8) calculates a phase difference d and a phase difference evaluation value from the function f(x) and the function g(x) as the focusing evaluation value. The phase difference d corresponds to a distance between peaks of the function f(x) and the function g(x). As the focused state is reached, that is, as the focus lens 40A reaches the focal position, the phase difference d is decreased. The phase difference evaluation value is represented by Expression (1) or Expression (2) below. In the same manner as the phase difference d, as the focused state is reached, a value of the phase difference evaluation value is decreased.

$$\text{Focusing evaluation value} = \int |f(x)-g(x)|dx \quad (1)$$

$$\text{Focusing evaluation value} = \int \{f(x)-g(x)\}^2 dx \quad (2)$$

In the fourth embodiment, the phase difference d and the phase difference evaluation value based on the light receiving result of the image plane phase difference pixel are calculated as the focusing evaluation value by the focusing evaluation value calculation portion 62C3. Thus, even with the imaging element 444 according to the fourth embodiment, the same effect as each of the embodiments is obtained. In addition, since the image plane phase difference pixel is used, the focusing evaluation value can be quickly obtained, compared to a case of calculating the contrast value as the focusing evaluation value.

While an example of a form of calculating both of the phase difference d and the phase difference evaluation value is illustratively described in the fourth embodiment, the technology of the present disclosure is not limited thereto. At least one of the phase difference d, the phase difference evaluation value, or the contrast value may be calculated as the focusing evaluation value.

In addition, while the image plane phase difference pixel is illustrated in the fourth embodiment, the technology of the present disclosure is not limited thereto. A phase difference sensor including the first pixel L and the second pixel R, and the imaging element 44 may be disposed separately from the imaging apparatus 10.

In addition, while the image data indicating the vertically ½ thinned image is illustrated as the thinned image data 69B1 in each of the embodiments, the technology of the present disclosure is not limited thereto. For example, in a case where n denotes a natural number greater than or equal to 3, image data indicating a vertically 1/n thinned image may be applied as the thinned image data. In addition, image data indicating a horizontally thinned image that is thinned in units of columns may be applied as the thinned image data, or image data indicating an image that is thinned in units of rows and units of columns may be applied as the thinned image data.

In addition, while an example of a form of outputting the thinned image data 69B1 is illustratively described in each of the embodiments, the technology of the present disclosure is not limited thereto. The captured image data 69B or processed image data obtained by performing signal processing on the captured image data 69B may be output instead of the thinned image data 69B1. The captured image data 69B and the processed image data are an example of "output image data" according to the embodiments of the technology of the present disclosure.

In addition, while the X-Trans arrangement is illustrated in each of the embodiment, the technology of the present disclosure is not limited thereto. Arrangement of the pixels may be other types of arrangement such as Bayer arrangement.

In addition, while an example of a form of performing the thinning processing on the captured image data 69B is illustratively described in each of the embodiments, imaging may be performed by driving the photoelectric conversion element 61 in a state where pixels of a part of all pixels included in the photoelectric conversion element 61 are thinned. As a method of thinning out the pixels, for example, a method of thinning out the pixels at specific intervals in the row direction and/or the column direction is illustrated.

In addition, an output method described in the first embodiment, an output method described in the second embodiment, and an output method described in the third embodiment may be selectively performed in accordance with an instruction received by the reception portion 84.

In addition, while "calculation" meaning derivation of a solution using a calculation expression is illustrated in each of the embodiments, the technology of the present disclosure is not limited thereto. For example, instead of "calculation", "derivation" using a look-up table may be applied, or the calculation expression and the look-up table may be used together. For example, "derivation" using the look-up table includes processing of deriving a solution as an output value using the look-up table that includes an independent variable of the calculation expression as an input value and a dependent variable (solution) of the calculation expression as an output value.

In addition, while an example of a form of implementing the processing circuit 62 by an ASIC is illustratively described in each of the embodiments, the technology of the present disclosure is not limited thereto. For example, the imaging processing may be implemented by a software configuration based on a computer.

Figure 33:
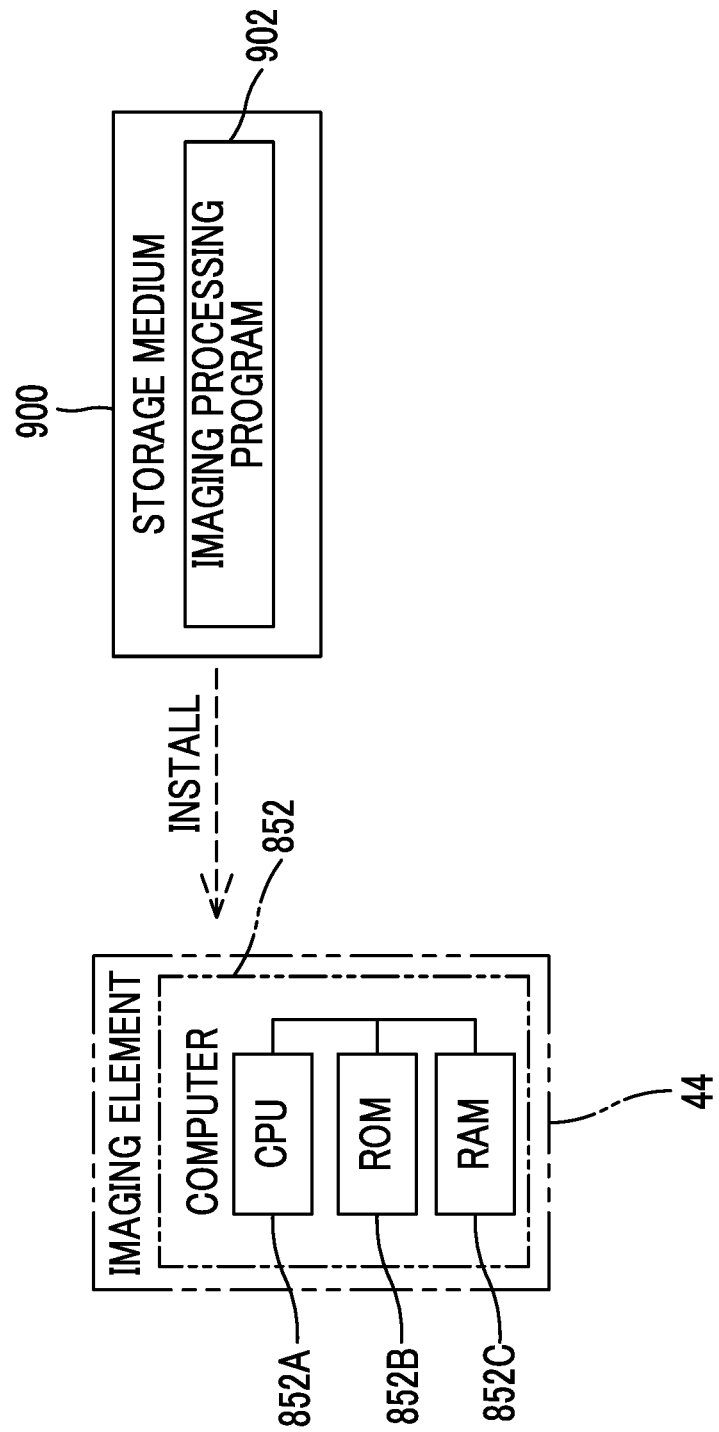
FIG. 33 is a conceptual diagram illustrating an example of an aspect in which a program is installed on a computer within the imaging element from a storage medium storing the program.

In this case, for example, as illustrated in FIG. 33, an imaging processing program 902 causing a computer 852 incorporated in the imaging element 44 to execute the imaging processing is stored in a storage medium 900.

The computer 852 comprises a CPU 852A, a ROM 852B, and a RAM 852C. The imaging processing program 902 of the storage medium 900 is installed on the computer 852, and the CPU 852A of the computer 852 executes the imaging processing in accordance with the imaging processing program 902.

While a single CPU is illustrated as the CPU 852A here, the technology of the present disclosure is not limited thereto. A plurality of CPUs may be employed instead of the CPU 852A. Any portable storage medium such as an SSD or a USB memory is illustrated as an example of the storage medium 900.

While the imaging processing program 902 is stored in the storage medium 900 in the example illustrated in FIG. 33, the technology of the present disclosure is not limited thereto. For example, the imaging processing program 902 may be stored in advance in the ROM 852B, and the CPU 852A may read out the program from the ROM 852B, load the program into the RAM 852C, and execute the loaded program.

In addition, the imaging processing program 902 may be stored in a storage portion of another computer, a server apparatus, or the like connected to the computer 852 through a communication network (not illustrated), and the imaging processing program 902 may be downloaded to the computer 852 in response to a request from the imaging apparatus 10. In this case, the downloaded imaging processing program 902 is executed by the CPU 852A of the computer 852.

In addition, the computer 852 may be disposed outside the imaging element 44. In this case, the computer 852 may control the processing circuit in accordance with the imaging processing program 902.

Various processors illustrated below can be used as a hardware resource for executing the imaging processing described in each of the embodiments. For example, as described above, a CPU that is a general-purpose processor functioning as the hardware resource for executing the imaging processing by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor.

The hardware resource for executing the imaging processing may be configured with one of those various processors or may be configured with a combination of two or more processors of the same type or different types (for example, a combination of a plurality of FPGAs or a combination of a CPU and an FPGA). In addition, the hardware resource for executing various types of processing according to the embodiments of the technology of the present disclosure may be one processor.

As an example of a configuration with one processor, first, as represented by a computer such as a client and a server, a form in which one processor is configured with a combination of one or more CPUs and software, and in which this processor functions as the hardware resource for executing in-imaging element processing is available. Second, as represented by a system-on-a-chip (SoC) or the like, a form of using a processor that implements, by one IC chip, a function of the entire system including a plurality of hardware resources for executing the imaging processing is available. The in-imaging element processing is implemented using one or more of the various processors as the hardware resource.

Furthermore, as a hardware structure of those various processors, more specifically, an electric circuit in which circuit elements such as semiconductor elements are combined can be used.

Figure 34:
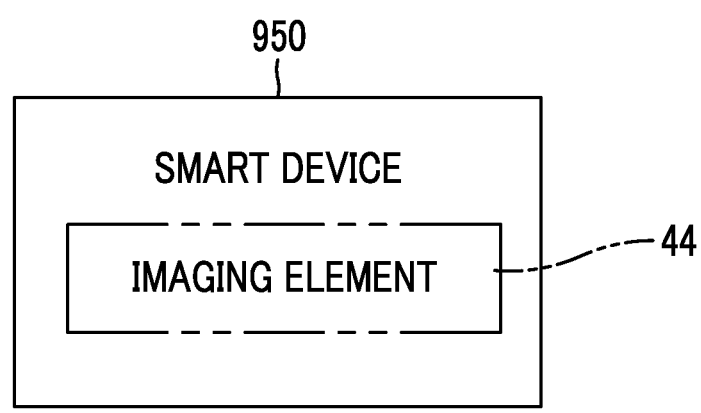
FIG. 34 is a block diagram illustrating an example of a schematic configuration of a smart device incorporating the imaging element according to the embodiments.

While an interchangeable lens camera is illustrated as the imaging apparatus in each of the embodiments, the technology of the present disclosure is not limited thereto. For example, the technology of the present disclosure may be applied to a smart device 950 illustrated in FIG. 34. The smart device 950 illustrated in FIG. 34 as an example is an example of the imaging apparatus according to the embodiments of the technology of the present disclosure. The imaging element 44 is mounted in the smart device 950. Even with the smart device 950 configured in such a manner, the same actions and effects as the imaging apparatus described in each of the embodiments are obtained. The technology of the present disclosure can be applied to not only the smart device 950 but also a personal computer or a wearable terminal apparatus.

While the first display 32 and the second display 86 are illustrated in each of the embodiments, the technology of the present disclosure is not limited thereto. For example, a separate display that is retrofit into the imaging apparatus main body 12 may be used as the "display portion" according to the embodiments of the technology of the present disclosure.

In addition, the imaging processing is merely an example. Accordingly, unnecessary steps may be deleted, new steps may be added, or a processing order may be rearranged without departing from a gist of the present disclosure.

Above described contents and illustrated contents are detailed description for parts according to the embodiment of the technology of the present disclosure and are merely one example of the technology of the present disclosure. For example, description related to the above configurations, functions, actions, and effects is description related to one example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. An imaging element comprising:
   a memory that stores image data obtained by imaging a subject at a first frame rate, and that is incorporated in the imaging element; and
   a processor that is incorporated in the imaging element, and that is configured to perform processing using the image data and to output output image data based on the image data at a second frame rate, based on a processing result,
   wherein the processor includes an output circuit that outputs the output image data at the second frame rate,
   the first frame rate is equal to or greater than the second frame rate, and the processor is configured to perform processing of deriving an evaluation value indicating a degree of focusing for the image data stored in the memory and changing the second frame rate based on the derived evaluation value.

2. The imaging element according to claim 1,
wherein the second frame rate is selectively set to a low frame rate and a high frame rate that is a frame rate higher than the low frame rate, and
the processor is configured to set the second frame rate to the high frame rate in a case in which the evaluation value is equal to or greater than a first threshold value, and set the second frame rate to the low frame rate in a case in which the evaluation value is less than the first threshold value.

3. The imaging element according to claim 1,
wherein the processor is configured to, in a case in which the evaluation value is less than a second threshold value, not output the image data of a derivation target for the evaluation value less than the second threshold value.

4. The imaging element according to claim 1,
wherein a changing timing of the second frame rate is set to be earlier, by a first number of frames, than a timing at which the evaluation value changes from a value less than a third threshold value to equal to or greater than the third threshold value.

5. The imaging element according to claim 1,
wherein a changing timing of the second frame rate is set to be later, by a second number of frames, than a timing at which the evaluation value changes from a value equal to or greater than a fourth threshold value to less than the fourth threshold value.

6. The imaging element according to claim 1,
wherein a changing timing of the second frame rate is set to be earlier, by a third number of frames, than a timing at which the evaluation value changes from a value less than a fifth threshold value to equal to or greater than the fifth threshold value, and the changing timing of the second frame rate is set to be later, by a fourth number of frames, than a timing at which the evaluation value changes from a value equal to or greater than the fifth threshold value to less than the fifth threshold value.

7. The imaging element according to claim 1,
wherein the processor is configured to:
perform thinning processing on the image data stored in the memory, and
derive the evaluation value for the image data after the thinning processing.

8. The imaging element according to claim 1, further comprising:
an image plane phase difference pixel that receives subject light showing the subject,
wherein the processor is configured to derive the evaluation value based on a light receiving result of the image plane phase difference pixel.

9. The imaging element according to claim 1,
wherein at least a photoelectric conversion element and the memory are formed in one chip.

10. The imaging element according to claim 9,
wherein the imaging element is a laminated imaging element in which the photoelectric conversion element is laminated with the memory.

11. An imaging apparatus comprising:
the imaging element according to claim 1; and
a display control processor configured to perform control for displaying an image on a display, based on the output image data output by the processor.

12. An imaging apparatus comprising:
the imaging element according to claim 1; and
a storage control processor configured to perform control for storing, in a storage device, the output image data output by the processor.

13. An operation method of an imaging element including a memory that stores image data obtained by imaging a subject at a first frame rate, and a processor configured to perform processing using the image data and to output output image data based on the image data at a second frame rate, based on a processing result, the memory and the processor being incorporated in the imaging element, wherein the processor includes an output circuit that outputs the output image data at the second frame rate,
the operation method comprising:
setting the first frame rate to be equal to or greater than the second frame rate; and
by the processor, performing processing of deriving an evaluation value indicating a degree of focusing for the image data stored in the memory and changing the second frame rate based on the derived evaluation value.

14. A non-transitory computer-readable storage medium storing a program for a computer applied to an imaging element including a memory that stores image data obtained by imaging a subject at a first frame rate, and a processor configured to perform processing using the image data and to output output image data based on the image data at a second frame rate, based on a processing result, the memory and the processor being incorporated in the imaging element, the program causing the computer to execute a specific process,
wherein the processor includes an output circuit that outputs the output image data at the second frame rate,
the first frame rate is equal to or greater than the second frame rate, and
the specific process comprises performing a process of deriving an evaluation value indicating a degree of focusing for the image data stored in the memory and changing the second frame rate based on the derived evaluation value.

\* \* \* \* \*